United States Patent
Abesser et al.

(10) Patent No.: US 11,557,279 B2
(45) Date of Patent: Jan. 17, 2023

(54) DEVICE, METHOD AND COMPUTER PROGRAM FOR ACOUSTIC MONITORING OF A MONITORING AREA

(71) Applicant: Fraunhofer-Gesellschaft zur Förderung der angewandten Forschung e.V., Munich (DE)

(72) Inventors: Jakob Abesser, Ilmenau (DE); Hanna Lukashevich, Ilmenau (DE); Steffen Holly, Ilmenau (DE); Yvette Körber, Zürich (CH); Reto Ruch, Zürich (CH)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 146 days.

(21) Appl. No.: 17/082,243

(22) Filed: Oct. 28, 2020

(65) Prior Publication Data
US 2021/0043193 A1 Feb. 11, 2021

Related U.S. Application Data

(63) Continuation of application No. PCT/EP2019/061699, filed on May 7, 2019.

(30) Foreign Application Priority Data

May 7, 2018 (DE) .................... 10 2018 207 084.9
Jul. 13, 2018 (DE) .................... 10 2018 211 758.6

(51) Int. Cl.
*G10L 15/08* (2006.01)
*G10L 21/0272* (2013.01)
*G10L 25/51* (2013.01)

(52) U.S. Cl.
CPC .......... *G10L 15/08* (2013.01); *G10L 21/0272* (2013.01); *G10L 25/51* (2013.01)

(58) Field of Classification Search
CPC ...... G10L 15/08; G10L 21/0272; G10L 25/51
See application file for complete search history.

(56) References Cited

U.S. PATENT DOCUMENTS

| 5,703,835 A | 12/1997 | Sharkey et al. |
| 10,332,543 B1 * | 6/2019 | Zopf ................ G10L 15/28 |

(Continued)

FOREIGN PATENT DOCUMENTS

| CN | 104359548 A | 2/2015 |
| CN | 106530705 A | 3/2017 |

(Continued)

OTHER PUBLICATIONS

Maijala et al., "Environmental noise monitoring using source classification in sensors," Applied Acoustics, vol. 129, vol. 129, Jan. 2018, pp. 258-267, ISSN 0003-682X, https://doi.org/10.1016/j.apacoust.2017.08.006 (Year: 2018).*

(Continued)

*Primary Examiner* — Michelle M Koeth
(74) *Attorney, Agent, or Firm* — McClure, Qualey & Rodack, LLP

(57) ABSTRACT

A device for acoustic monitoring of a monitoring area includes first and second sensor systems which have first and second acoustic sensors, processors, and transmitter, respectively, and which may be mounted at different locations of the monitoring area. The first and second processors may be configured to classify first and second audio signals detected by the first and second acoustic sensors so as to obtain first and second classification results, respectively. The first and second transmitter may be configured to transmit the first and second classification results to a central evaluator, (Continued)

respectively. In addition, the device may include the central evaluator, which may be configured to receive the first classification result and to receive the second classification result, and to generate a monitoring output for the monitoring area as a function of the first classification result and the second classification result.

22 Claims, 6 Drawing Sheets

(56) References Cited

U.S. PATENT DOCUMENTS

| | | | | |
|---|---|---|---|---|
| 2005/0248454 | A1* | 11/2005 | Hanson | H04Q 9/00 340/539.22 |
| 2009/0009339 | A1 | 1/2009 | Gorrell et al. | |
| 2016/0078760 | A1 | 3/2016 | Crickmore et al. | |
| 2016/0364963 | A1* | 12/2016 | Matsuoka | G06V 10/40 |
| 2018/0047415 | A1* | 2/2018 | Nongpiur | G10L 25/51 |
| 2018/0108369 | A1* | 4/2018 | Gross | B60R 25/1009 |
| 2019/0042881 | A1* | 2/2019 | Lopatka | G06K 9/6223 |
| 2019/0043525 | A1* | 2/2019 | Huang | G10L 25/21 |

FOREIGN PATENT DOCUMENTS

| | | |
|---|---|---|
| DE | 102012211154 A1 | 1/2014 |
| EP | 2 704 120 A1 | 3/2014 |
| EP | 2988105 A2 | 2/2016 |

OTHER PUBLICATIONS

A. Liutkus et al.: "Kernel additive models for source separation," IEEE Trans. Signal Process., vol. 62, No. 16, pp. 4298-4310, 2014.
D. Barry et al.: "Sound source separation: azimuth discrimination and resynthesis," in Proc. 7th Int. Conf. Digital Audio Effects (DAFx'04), Naples, Italy, Oct. 2004.
C. Avendano: "Frequency-domain source identification and manipulation in stereo mixes for enhancement, suppression and re-panning applications," in Proc. IEEE Workshop Appl. Signal Process. Audio Acoust. (WASPAA), New York, USA, Oct. 2003, pp. 55-58.
T. Prätzlich et al.: "Kernel additive modeling for interference reduction in multi-channel music recordings," in Proc. Int. Conf. Acoust. Speech Signal Process. (ICASSP), Brisbane, Australia, 2015, pp. 584-588.
L. Gu et al.: "Lightweight Detection and Classification for Wireless Sensor Networks in Realistic Environments" in Proceedings of the 3rd International Conference on Embedded Networked Sensor Systems (SenSys 2005), 2005, pp. 205-217.
SwissMonitor: Baustellen-Monitoring—eine interdisziplinare Aufgabe. In: 20. Symposium Bauwerksdynamik und Erschütterungsmessungen 2017, 2017. URL: https:llde.bsf-swissphoto.com/media/publikationen/2017-06_Symposium Bauwerksdynamik Baustellen-Monitoring.pdf.
D. Botteldooren et al.: "Fusion of multiple microphone array data for localizing sound sources in an industrial area" in Inter-Noise 2016, 2016, pp. 1-8. URL: http://pub.dega-akustik.de/IN2016/data/articles/001008.pdf.
A. Luque et al.: "Evaluation of the Processing Times in Anuran Sound Classification" in: Wireless Communications and Mobile Computing, vol. 2017, 2017, pp. 1-16.
E. Cano et al.: "Exploring Sound Source Separation for Acoustic Condition Monitoring in Industrial Scenarios" in 25th European Signal Processing Conference (EUSIPCO 2017), 2017, pp. 2264-2268.
http://www.1000eyes.de/videoueberwachung/baustellen-webcam.
Search Report, dated Jul. 1, 2019, from PCT/EP2019/0616699.
International search report and written opinion, dated Jun. 1, 2019.
Office Action dated Mar. 24, 2022, issued in application No. SG 11202010957W.

* cited by examiner

DEVICE, METHOD AND COMPUTER PROGRAM FOR ACOUSTIC MONITORING OF A MONITORING AREA

CROSS-REFERENCES TO RELATED APPLICATIONS

This application is a continuation of copending International Application No. PCT/EP2019/061699, filed May 7, 2019, which is incorporated herein by reference in its entirety, and additionally claims priority from German Applications Nos. DE 10 2018 207 084.9, filed May 7, 2018, and DE 10 2018 211 758.6, filed Jul. 13, 2018, both of which are incorporated herein by reference in their entirety.

Embodiments according to the invention refer to a device, a method and a computer program for acoustic monitoring of a monitoring area.

BACKGROUND OF THE INVENTION

Monitoring areas have been monitored in most varied ways up to now. For example, building-site documentation may be performed, or other monitoring areas may be supervised, by means of a video/infrared camera (e.g. http://www.1000eyes.de/videoueberwachung/baustelen-webcam). The motivation for video/infrared camera systems usually lies in the protection against theft, vandalism and sabotage. With the help of the video/infrared cameras, manual evaluation of the construction progress may be possible in some circumstances, or monitoring of a traffic volume on a road system. To this end, however, large amounts of data are typically transmitted and processed.

On construction sites, the area to be monitored is often monitored by persons rather than by machines or appliances. For example, a comparison of the construction plan with the actual construction progress may be carried out (more or less regularly) by the site manager. The site manager checks, for example, which construction goals (e.g. completion of the $3^{rd}$ floor in building construction) have been reached/have not been reached within the given time frame. Thus, an analysis of causes for construction delays is possible only within a rough time period and entails considerable expenditure in terms of personnel.

For precisely timed process monitoring in your monitoring area, there are currently only very complex monitoring systems that can hardly be implemented in terms of logistics. If, for example, activities, phases of a process or events in a monitoring area are to be monitored, there is no simple monitoring system that can be implemented at low cost.

In view of this, there is a need for a concept that provides an improved compromise between precisely timed and spatial process monitoring, a simple system that may be implemented logistically, and a reduction in the amount of data to be transferred from the monitoring area to, for example, a central server.

SUMMARY

According to an embodiment, a device for acoustic monitoring of a monitoring area may have: a first sensor system having a first acoustic sensor, a first processor, and first transmitter, which system may be mounted at a first location of the monitoring area; a second sensor system having a second acoustic sensor, a second processor, and second transmitter, which system may be mounted at a second location of the monitoring area that is different from the first location, wherein the first processor is configured to classify a first audio signal detected by the first acoustic sensor so as to achieve a first classification result, wherein the second processor is configured to classify a second audio signal detected by the second acoustic sensor so as to achieve a second classification result, wherein the first transmitter is configured to transmit the first classification result to a central evaluator, wherein the second transmitter is configured to transmit the second classification result to the central evaluator, the central evaluator, the central evaluator being configured to receive the first classification result and to receive the second classification result, and to generate a monitoring output for the monitoring area as a function of the first classification result and the second classification result; wherein the first transmitter is configured to transmit a first signal to the central evaluator only if the first classification result matches a first predetermined classification result; wherein the second transmitter is configured to transmit a second signal to the central evaluator only if the second classification result matches a second predetermined classification result; and wherein the central evaluator is configured to count, on the basis of the first signal, how many times, per time interval, the first sensor system has determined the first predetermined classification result, or to count, on the basis of the second signal, how many times, per time interval, the second sensor system has determined the second predetermined classification result.

According to another embodiment, a method of acoustic monitoring of a monitoring area may have the steps of: mounting a first sensor system having a first acoustic sensor, a first processor and first transmitter at a first location of the monitoring area; mounting a second sensor system having a second acoustic sensor, a second processor and second transmitter at a second location of the monitoring area, which is different from the first location, classifying a first audio signal detected by the first acoustic sensor by using the first processor to achieve a first classification result; classifying a second audio signal detected by the second acoustic sensor by using the second processor to achieve a second classification result; transmitting the first classification result to a central evaluator on the part of the first transmitter; transmitting the second classification result to the central evaluator on the part of the second transmitter; receiving the first classification result and the second classification result on the part of central evaluator; and generating a monitoring output for the monitoring area as a function of the first classification result and the second classification result on the part of the central evaluator, wherein a first signal is transmitted to the central evaluator only if the first classification result matches a first predetermined classification result; wherein a second signal is transmitted to the central evaluator only if the second classification result matches a second predetermined classification result; and counting, on the basis of the first signal, how many times, per time interval, the first sensor system has determined the first predetermined classification result, or counting, on the basis of the second signal, how many times, per time interval, the second sensor system has determined the second predetermined classification result.

According to yet another embodiment, a non-transitory digital storage medium may have a computer program stored thereon to perform the method of acoustic monitoring of a monitoring area, which method may have the steps of: mounting a first sensor system having a first acoustic sensor, a first processor and first transmitter at a first location of the monitoring area; mounting a second sensor system having a second acoustic sensor, a second processor and second transmitter at a second location of the monitoring area, which is different from the first location, classifying a first audio signal detected by the first acoustic sensor by using the first processor to achieve a first classification result; classifying a second audio signal detected by the second acoustic sensor by using the second processor to achieve a second classification result; transmitting the first classification result to a central evaluator on the part of the first transmitter; transmitting the second classification result to the central evaluator on the part of the second transmitter; receiving the first classification result and the second classification result on the part of central evaluator; and generating a monitoring output for the monitoring area as a function of the first classification result and the second classification result on the part of the central evaluator, wherein a first signal is transmitted to the central evaluator only if the first classification result matches a first predetermined classification result; wherein a second signal is transmitted to the central evaluator only if the second classification result matches a second predetermined classification result; and counting, on the basis of the first signal, how many times, per time interval, the first sensor system has determined the first predetermined classification result, or counting, on the basis of the second signal, how many times, per time interval, the second sensor system has determined the second predetermined classification result, when said computer program is run by a computer.

According to yet another embodiment, a device for acoustic monitoring of a monitoring area may have: a first sensor system having a first acoustic sensor, a first processor, and first transmitter, which system may be mounted at a first location of the monitoring area; a second sensor system having a second acoustic sensor, a second processor, and second transmitter, which system may be mounted at a second location of the monitoring area that is different from the first location, wherein the first processor is configured to classify a first audio signal detected by the first acoustic sensor so as to achieve a first classification result, wherein the second processor is configured to classify a second audio signal detected by the second acoustic sensor so as to achieve a second classification result, wherein the first transmitter is configured to transmit the first classification result to a central evaluator, wherein the second transmitter is configured to transmit the second classification result to the central evaluator, the central evaluator, the central evaluator being configured to receive the first classification result and to receive the second classification result, and to generate a monitoring output for the monitoring area as a function of the first classification result and the second classification result; wherein the first audio signal detected by the first acoustic sensor is a superposition of at least two sound events; and wherein the first processor is configured to apply a source separation algorithm to the first audio signal to classify the at least two sound events or to acquire a first source signal and a second source signal which represent the at least two sound events so as to classify the first source signal and the second source signal.

An embodiment relates to a device for acoustic monitoring of a monitoring area. The device may comprise a first sensor system comprising a first acoustic sensor, a first processor, and first transmission means, which system may be mounted at a first location of the monitoring area, and a second sensor system comprising a second acoustic sensor, a second processor, and second transmission means, which system may be mounted at a second location of the monitoring area that is different from the first location The first processor may be configured to classify a first audio signal detected by the first acoustic sensor so as to obtain a first classification result, and the second processor may be configured to classify a second audio signal detected by the second acoustic sensor so as to obtain a second classification result. In addition, the first transmission means may be configured to transmit the first classification result to a central evaluation means, and the second transmission means may be configured to transmit the second classification result to the central evaluation means. Moreover, the device may comprise the central evaluation means, which may be configured to receive the first classification result and to receive the second classification result, and to generate a monitoring output for the monitoring area as a function of the first classification result and the second classification result.

This embodiment of the device is based on the finding that the audio signal (e.g., the first audio signal or the second audio signal) detected by the acoustic sensor (e.g., the first acoustic sensor or the second acoustic sensor) is classified by the processor (e.g., the first processor or the second processor) in order to generate a classification result (e.g., the first classification result or the second classification result), which is transmitted to a central evaluation means by means of the transmission means (e.g. the first transmission means or the second transmission means), whereby, for example, only one classification result is transmitted rather than the entire audio signal. By this measure, a very small amount of data is transmitted in the form of the classification result, so that transmission may be effected very quickly and efficiently. In addition, the second sensor system may be mounted at a second location of the monitoring area, for example, which may be different from the first location at which the first sensor system may be mounted, whereby the monitoring area may also be monitored spatially in addition to precisely timed process monitoring.

The device is also a system that can be readily implemented in terms of logistics since the first sensor system and the second sensor system may be mounted individually, on the basis of the monitoring area, at a first location and a second location of the monitoring area, respectively. In addition, the central evaluation means may be wirelessly connected to the first/second transmission means of the first/second sensor system, allowing the user of the device to place the central evaluation means remotely from the monitoring area, for example, to monitor the monitoring area remotely without the presence of the user. For example, the central evaluation means may be configured to provide the user of the device with the monitoring output for the monitoring area at an external computer, a mobile device such as a cell phone or a tablet. For example, the monitoring output may include information indicating that everything in the monitoring area is going according to plan or deviating from a plan. However, the monitoring output may also represent a list of temporal and spatial activities, events or phases of a process in the monitoring area.

According to an embodiment, the first transmission means, the second transmission means and the central evaluation means may be configured to wirelessly communicate with each other in accordance with a mobile radio protocol. Thus, it is not necessary for the first transmission means, the second transmission means and the central evaluation means to be connected by cable, which may result in the user not having to be present at the monitoring area in order to receive the monitoring output for the monitoring area since the central evaluation means may be located, because of the wireless communication, at the user's location far from the monitoring area.

According to an embodiment, the first classification result and the second classification result may be configured to indicate appliances used in the monitoring area, activities in the monitoring area, volumes in the monitoring area, phases of a process in the monitoring area, or a match of at least part of the first audio signal or of the second audio signal with a predetermined classification result. For example, the first or second audio signal may be a drilling noise. Accordingly, in case of classification in the equipment category in the monitoring area, the processor would receive the "drill" classification result, and in case of classification in the activities category in the monitoring area, the processor would receive the "drilling" classification result. An activity in the monitoring area may include a process in the monitoring area, a machine in use in the monitoring area, or a human activity in the monitoring area. However, the drilling noise may also be classified into sound levels, whereby, for example, the first classification result or the second classification result may indicate a rough classification, such as very loud, loud, comfortably loud, quiet, very quiet, etc., or a very fine classification, such as a sound pressure indication in the unit of pascal, or a sound pressure level indication in the unit of decibel. For example, if the classification result indicates a phase of a process, the drilling may be categorized into a second phase, and the classification result may thus indicate the second phase, or for example, if the monitoring area represents a construction site, the classification result may indicate that a construction process is currently in an interior-work phase (this is an example of how the drilling noise may be associated with a process phase). In the first/second processor, for example, a drilling noise may be stored as a predetermined classification result, whereby the first/second classification result may indicate a match, which may represent a logical one, a ping, a characteristic signal, etc. Thus, the first/second classification result not only reduces the amount of data to be transmitted from a first/second audio signal to a first/second classification result, but also pre-evaluates the audio signal, so that the first classification result or the second classification result already indicates what has happened in the monitoring area in a manner that may be detected acoustically. Thus, the monitoring area may be monitored in the easiest way.

According to an embodiment, the first processor may be configured to convert the first audio signal detected by the first acoustic sensor to a time/frequency representation, and the first processor may be configured to classify the first audio signal by using the time/frequency representation so as to obtain a first classification result. The time/frequency representation may reflect the spectrum of the first audio signal. For example, different sounds may be associated with a specific noise source on the basis of their characteristic spectra. For example, rotating machine parts such as pumps, turbines, electric motors, etc., produce a periodic time curve of the forces, which may correspond to a line spectrum in an associated frequency spectrum. Depending on the rotation of the machine part, the line spectra may differ from one another. Stochastic noise excitation with a broadband frequency spectrum may occur, for example, on tooth flanks of two meshing gears, also on rolling wheels, such as rolling noises of road and rail vehicles, or during material machining such as milling, turning, drilling, grinding, sawing or planing.

Each noise may have an individual spectrum (time/frequency representation), which means that it may be quickly and easily recognized by the first processor, for example in the first audio signal converted to the time/frequency representation. This simplifies classification of the first audio signal and allows the processor to perform it more quickly. If, for example, at least part of the time/frequency representation of the first audio signal matches a classification (e.g. spectra of different appliances/machines, spectra of different activities, etc.), the first classification result may indicate this classification, for example.

For example, if at least two noises are superimposed, at least two spectra of the at least two noises may be reflected in the time/frequency representation. For example, the first acoustic sensor may detect by a first audio signal, which may have a drilling noise as well as a hammering noise. Because the hammering noise may have a different frequency spectrum than the drilling noise, both drilling and hammering may be detected from the time/frequency representation of the first audio signal, so that the first classification result may indicate drilling and hammering.

According to an embodiment, the first classification result or the second classification result may be a classification result for a construction site event, the construction site event being formed as a group that includes a tool noise, a hammering noise, a sawing noise, a drilling noise, a pneumatic hammering noise, a measuring device noise, a machine noise, a burden chain noise, a concrete mixing noise, a concrete casting noise, an excavator noise, a roller noise, a material unloading noise, a tear-down noise (e.g. (e.g. caused by a wrecking ball or an explosive device) or a scaffolding noise. This enables the device to monitor a construction site, for example, as the monitoring area. Thus, for example, acoustic monitoring may determine when and where different activities are carried out or tools or machines are used. Thus, processes and construction progresses on construction sites may be monitored spatially and in a precisely timed manner.

According to an embodiment, the first sensor system or the second sensor system may be battery- or accumulator-operated. Thus, the first sensor system as well as the second sensor system may be operated independently of an external power source. This allows the first sensor system as well as the second sensor system to be mounted in the monitoring area in an individual manner that is easy to implement in terms of logistics.

According to an embodiment, the first acoustic sensor may be configured to measure a first level of the first audio signal, and the first transmission means may be configured to transmit the first level to the central evaluation means. The level may be a sound pressure (e.g. in pascal or in bar), sound energy (in watt), sound power (in watt), a sound intensity (e.g. in watt/m$^2$), a sound power level (e.g. e.g. in dB), a sound intensity level (e.g. in decibel), a sound pressure level (e.g. in decibel), a volume level (e.g. in phon or in decibel (A)), or a loudness (e.g. in sone). Thus, the device is enabled not only to classify the first audio signal, but also to measure the first level of the first audio signal in order to perform, for example, volume monitoring in the monitoring area.

According to an embodiment, the second acoustic sensor may be configured to measure a second level of the second audio signal, and the second transmission means may be configured to transmit the second level to the central evaluation means, and the central evaluation means may be configured to spatially locate a source of the first audio signal and of the second audio signal in the monitoring area as a function of the first level and of the second level while using information about the first location and information about the second location in case of a match between the first classification result and the second classification result.

The first classification result may, for example, have a classification of a first sound event (e.g. a passing truck) and a second sound event (e.g. a concrete mixing noise), and the second classification result may also have a classification of the second sound event (e.g. concrete mixing noise) and additionally a third sound event (e.g. a burden chain noise). Thus, the first classification result and the second classification result match in that both include a classification of the second sound event. Thus, the first level may also include a level of the first sound event as well as of the second sound event and the second level may also include a level of the second sound event and of the third sound event. If the central evaluation means ascertains, for example, that the level of the second sound event of the first level is lower than the level of the second sound event of the second level, the central evaluation means may conclude from this that the source of the first audio signal and of the second audio signal (e.g. of the second sound event) is located closer to the second sensor system. On the basis of the first level and of the second level as well as of the first location and the second location, a source of the first audio signal and of the second audio signal may be located very accurately in the monitoring area. For example, a source of part of the first audio signal and of at least part of the second audio signal may match. According to the example described here, the match may be the source of the second sound event.

Optionally, the device may also spatially locate the first sound event and the third sound event in the monitoring area according to the example described above. Because the first sound event was detected only by the first sensor system, and the third sound event was detected only by the second sensor system, the central evaluation means may conclude that a source of the first sound event obtained from the first audio signal is located in a measuring area of the first sensor system but outside a measuring area of the second sensor system and that a source of the third sound event obtained from the second audio signal is located in the measuring area of the second sensor system but outside the measuring area of the first sensor system.

According to an embodiment, the central evaluation means may be configured to indicate an upper limit value being exceeded by the first level in the monitoring output. Thus, the device may be used to monitor volumes in the monitoring area, for example. If, for example, processes, activities or machines in the monitoring area have to work more quietly than the upper limit value, the monitoring output may indicate when this upper limit value has been exceeded.

According to an embodiment, the first acoustic sensor may be configured to detect the first audio signal, and the first acoustic sensor may be configured to measure a first level of the first audio signal. The first acoustic sensor may also be configured to switch the first processor or the first transmission means from a sleep mode to an operating mode only when a lower limit value for the first level is exceeded, and the first processor may be configured to determine the first classification result or the second classification result only in the operating mode, or the first transmission means may be configured to perform transmission only in the operating mode, and the first transmission means or the processor may be configured to consume less power in the sleep mode than in the operating mode. The fact that the processor or transmission means is switched from a sleep mode to an operating mode only when a lower limit value for the level is exceeded prevents the device from processing background noise. This ensures that the processor performs classification only when a sound event has occurred in the monitoring area whose level is higher than the lower limit value. In this way, for example, the acoustic sensor may permanently detect the first audio signal and may only temporarily initiate further processing of the first audio signal by the processor or the transmission means. Thus, for example, the transmission means or the processor hardly produces any power in the sleep mode, which means that less energy may be consumed in the sleep mode than in the operating mode.

According to one embodiment, the first acoustic sensor may be configured to detect the first audio signal. The first acoustic sensor may be configured to measure a first level of the first audio signal and to set the first processor or the first transmission means so that the first classification result is determined by the first processor and is transmitted to the central evaluation means by means of the first transmission means, if the first level is higher than a lower limit value, and that no first classification result is determined by the first processor and is transmitted to the central evaluation means by means of the first transmission means if the first level is less than or equal to the lower limit value. This enables the first processor and the first transmission means to continue working with the first audio signal only if the first acoustic sensor has detected that the measured first level is higher than the lower limit value, which allows to conclude that an acoustic event has occurred in the monitoring area. Thus, it may be avoided that the device erroneously indicates sound events in the monitoring area although no sound event has occurred.

According to an embodiment, the first audio signal detected by the first acoustic sensor may be a superposition of at least two sound events. Furthermore, the first processor may be configured to apply a source separation algorithm to the first audio signal so as to classify the at least two sound events or to obtain a first source signal and a second source signal representing the at least two sound events in order to classify the first source signal and the second source signal. For example, this feature allows to classify the at least two sound events directly with the source separation algorithm. The source separation algorithm may, for example, compare classification signals with the first audio signal in order to separate the at least two sound events from each other and at the same time associate them with a classification (e.g. a classification signal). Alternatively, the source separation algorithm may also first separate the first audio signal into a first source signal and a second source signal, allowing the processor to separately classify the first source signal and classify the second source signal, whereby, in this alternative, the classification process of the first processor is performed in two steps. By the source separation algorithm, the device is configured to classify complex superimposed sound events in one audio signal and to order several activities, processes or machines in the monitoring area.

For example, if the acoustic sensor is equipped with a B-format microphone, the at least two sound events may be separated into at least two source signals, for example, by means of a spatial separation. Thus, the device involved may be a spatial source separation algorithm, for example. Another possibility is spectral source separation by a DirAC method (directional audio coding). The DirAC method may represent a spectral source separation algorithm. The source separation algorithms described herein may be applied within the device, for example, in the first processor of the first sensor system or in the second processor of the second sensor system, in order to be able to separate complex superimposed sound events with the device, for example, to be able to simultaneously monitor several events in the monitoring area. According to an embodiment, the source separation algorithm may be a kernel additive model (see, e.g., [1]), an ADRess algorithm (azimuth discrimination and resynthesis see e.g. [2]) or an ADRess algorithm (azimuth discrimination and resynthesis, see, e.g., [3]). e.g. [2]), an FDSI algorithm (frequency-domain source identification, see, e.g., [3]) or a KAMIR algorithm (kernel additive modeling for interference reduction, see, e.g., [4]). All enumerations of source separation algorithms that are listed here are to be seen as exemplary rather than exhaustive.

According to an embodiment, the first transmission means may be configured to transmit the first classification result with first local (e.g., a sensor ID or the first location) or temporal information to the central evaluation means, and the central evaluation means may be configured to generate the first classification result in conjunction with the first local and temporal information as monitoring output for the monitoring area. For the temporal information, the first transmission means may transmit a time stamp, for example. The monitoring output may, for example, be a table in which the first classification result may be displayed in connection with the first local and temporal information. This enables precisely timed and spatial process monitoring in the monitoring area to be accomplished by the device. For example, it is possible to determine which machines, activities or processes were used at the first location at the same time or at different times.

According to an embodiment, the central evaluation means may have a memory for storing a specified process schedule plan comprising a series of activities in the monitoring area, and a processor for arranging the first classification result and the second classification result in an order defined by spatial or temporal information about the first sensor system. The first classification result and the second classification result may indicate the activities in the monitoring area. The processor may be configured to compare the specified process schedule plan with the arranged first and second classification results and to generate a monitoring output as a function of a result of the comparison. The specified process schedule plan may define, for example, at which time and at which location in the monitoring area a certain activity or process should be carried out or a certain machine should be in operation.

The order in which the first classification result and the second classification result are arranged may, for example, indicate when and at which location in the monitoring area a certain activity or process was performed, or a certain machine was in operation. By means of the processor, the central evaluation means may compare the specified process schedule plan with the order and may thus determine, for example, whether a deviation has occurred between the specified process schedule plan and the order. This deviation may, for example, be regarded as the result of the comparison. The monitoring output may, for example, include the statement "everything is going according to plan", "a deviation from the plan has occurred", or a direct statement about the type of deviation between the process schedule plan and the order (the order may represent the ordered first and second classification results). However, the monitoring output may also be a light signal, for example a green light for everything is according to plan and a red light for there are deviations in the monitoring area. Alternatively, the monitoring output may also be an acoustic signal.

According to an embodiment, the monitoring output may indicate a difference between the specified process schedule plan and the arranged first and second classification results. For example, the monitoring output may indicate that an activity in the monitoring area took less or more time than the time specified in the process schedule plan, or may indicate that another activity was performed at a certain time or place although this activity should have been performed at another time or place.

According to an embodiment, the first sensor system may be configured to continuously detect a first audio signal with the first acoustic sensor in order to classify the first audio signal in the processor within a first maximum time period, the first maximum time period being shorter than five seconds, and the first transmission means may be configured to transmit the first classification result to the central evaluation means within a second maximum time period, the second maximum time period being shorter than five seconds (s). According to an embodiment, the first maximum time period or the second maximum time period may also be shorter than 1° s, 500° ms, 100° ms, 50° ms or 10° ms. Thus, for example, the first audio signal is classified by the first processor within a very short time and is transmitted to the central evaluation means by the first transmission means within a very short time, whereby the device may be configured to perform a real-time analysis of the detected audio signals. Thus, precisely timed process monitoring may be implemented with the device. Optionally, the second sensor system may be configured to continuously detect a second audio signal with the second acoustic sensor in order to classify the second audio signal in the second processor within the first maximum time period, and the second transmission means may be configured to transmit the second classification result to the central evaluation means within the second maximum time period.

According to an embodiment, the first sensor system may be configured to receive the first classification result at a first time and at a second time by means of the first processor and to transmit it to the central evaluation means by means of the first transmission means. The central evaluation means may further be configured to order and indicate the first classification result of the first point in time and the second classification result of the second point in time as a function of the first point in time or the second point in time. This allows acoustically monitoring the monitoring area over a long period of time and to perform a long-term evaluation.

According to an embodiment, the first transmission means may be configured to transmit an identification of the first sensor system with the first classification result to the central evaluation means. The second transmission means may be configured to transmit an identification of the second sensor system with the second classification result to the central evaluation means. The central evaluation means may have a memory, the memory may have an association of the identification of the first sensor system with the first location and the identification of the second sensor system with the second location. The central evaluation means may be configured to determine the first location on the basis of the identification of the first sensor system from the memory and to determine the second location on the basis of the identification of the second sensor system from the memory and to spatially locate a first source region of the first audio signal and a second source region of the second audio signal in the monitoring area on the basis of the first location, the second location, the first classification result or the second classification result. An identification may be a sensor ID, for example. Thus, it is possible to locate a sound event in the monitoring area merely by identifying the first sensor system or the second sensor system. This is based on the knowledge that the first sensor system as well as the second sensor system have an area where an audio signal may be detected within the monitoring area. The area for the first sensor system may overlap with the area for the second sensor system to a certain extent. If both the first sensor system and the second sensor system detect the same sound event (e.g. the first classification result and the second classification result match), the central evaluation means may conclude that the first source area matches the second source area and is located in an overlapping area of the first sensor system with the second sensor system. If, however, only the first sensor system captures the sound event (e.g. the first classification result does not correspond to the classification result), the central evaluation means may conclude that the first source area is located in a capturing area of the first sensor system but not in a capturing area overlapping with the second sensor system.

According to an embodiment, the first transmission means may be configured to transmit only the first classification result or a processed first audio signal to the central evaluation means, and the second transmission means may be configured to transmit only the second classification result or a processed second audio signal to the central evaluation means. This enables only a small amount of data to be transmitted between the transmission means and the central evaluation means. In addition, it is not the original first audio signal but a distorted, incomprehensible signal that is transmitted to the central evaluation means, so that despite distortion, a first sound event may be classified from the first audio signal, for example, but speech is no longer understandable, for example. In this way, the device may be used to meet data protection requirements, for example.

According to an embodiment, the first transmission means may be configured to transmit a first signal to the central evaluation means only if the first classification result matches a first predetermined classification result. The second transmission means may be configured to transmit a second signal to the central evaluation means only if the second classification result matches a second predetermined classification result. The central evaluation means may be configured to count, on the basis of the first signal, how many times per time period the first sensor system has determined the first predetermined classification result, or to count, on the basis of the second signal, how many times per time period the second sensor system has determined the second predetermined classification result. The central evaluation means may, for example, count the first signal or the second signal. The first signal or the second signal may be a logical 1, a ping or a characteristic signal, for example. Furthermore, the first and second predetermined classification results may be identical. For example, the predetermined classification result may be a passing car, so the central evaluation means is configured to determine how often a car passes the first sensor system or the second sensor system. Optionally, the first and the second predetermined classification result may also be different from each other. In this case, for example, the first predetermined classification result may correspond to a passing car, and the second predetermined classification result may correspond to a passing truck. Thus, the device is configured, for example, to determine how many cars or trucks pass the first sensor system and/or the second sensor system within a monitoring area. This enables the device to monitor capacity utilization of a traffic network.

According to an embodiment, the first predetermined classification result and the second predetermined classification result may be a classification result for a vehicle (e.g. car, bus, truck, train (differentiation between freight train/passenger train), possibly airplane, bicycle). The first monitoring area and the second monitoring area may be, e.g., a road, a road network or a rail network, and the first sensor system or the second sensor system may be mounted to roads or rails. The central evaluation means may be configured to provide capacity utilization of the monitoring area per location or group of locations. Thus, the device may be configured, for example, to monitor a road, a road network or a rail network with temporal and spatial accuracy. So the device may be used, e.g., for traffic light control that is actuated by traffic. For example, if the device detects high capacity utilization of the monitoring area for a certain location, it may be arranged for a traffic light to switch from red to green more quickly and for there to be shorter waiting times in the road network. If, on the other hand, the device detects only a low capacity utilization in the road network, it may be arranged, for example, for a traffic light at that location to have a slower switching behavior.

According to an embodiment, the monitoring area may be a construction site, a factory building with machines, a machine, or an inhabited place or part of an inhabited place. For example, an inhabited place may be not only a residential building, but also a road network that leads into a residential area or at least partly through a residential area. Thus, the device is individually applicable for most varied monitoring areas.

An embodiment provides a method of acoustic monitoring of a monitoring area comprising the steps of mounting a first sensor system comprising a first acoustic sensor, a first processor and first transmission means at a first location of the monitoring area, mounting a second sensor system comprising a second acoustic sensor, a second processor and second transmission means at a second location of the monitoring area, which is different from the first location, classifying a first audio signal detected by the first acoustic sensor by using the first processor to obtain a first classification result, classifying a second audio signal detected by the second acoustic sensor by using the second processor to obtain a second classification result, transmitting the first classification result to a central evaluation means on the part of a first transmission means, transmitting the second classification result to the central evaluation means on the part of the second transmission means, receiving the first classification result and the second classification result on the part of central evaluation means, and generating a monitoring output for the monitoring area as a function of the first classification result and the second classification result on the part of the central evaluation means.

An embodiment relates to a computer program comprising a program code for performing a method when the program runs on the computer.

BRIEF DESCRIPTION OF THE DRAWINGS

Embodiments according to the present invention will be explained in more detail below with reference to the enclosed figures. With regard to the schematic figures shown, it shall be pointed out that the functional blocks shown are to be understood both as elements or features of the inventive device and as corresponding method steps of the inventive method, and that corresponding method steps of the inventive method may also be derived therefrom, wherein.

DETAILED DESCRIPTION OF THE INVENTION

Figure 1:
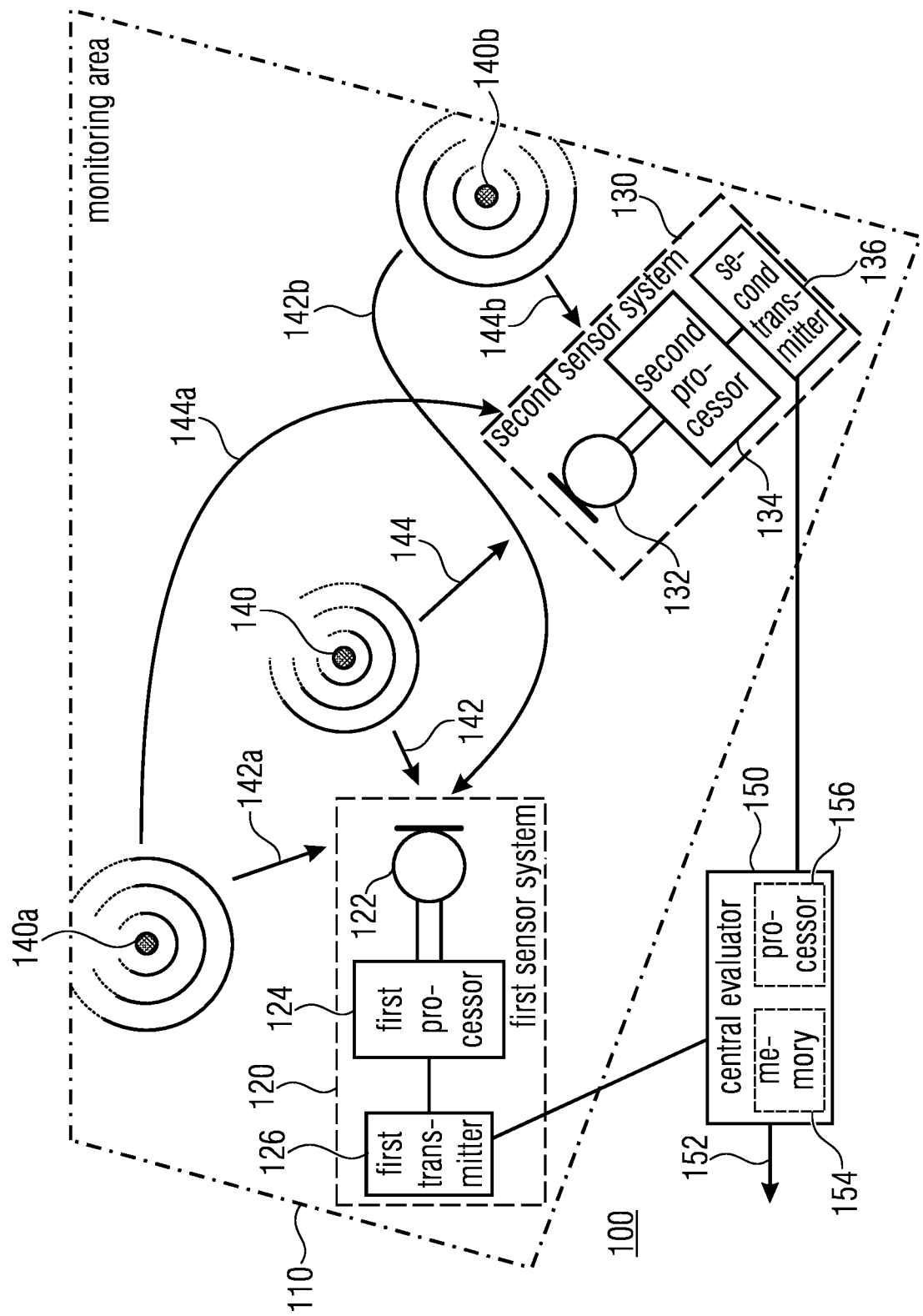
FIG. 1 shows a schematic representation of a device according to an embodiment of the present invention.

Before embodiments of the present invention will be explained in detail below by means of the drawings, it shall be pointed out that elements, objects and/or structures in the different figures that are identical, identical in functionality or identical in action are provided with the same reference numerals, so that the descriptions of these elements provided in different embodiments are interchangeable and/or mutually applicable.

FIG. 1 shows a representation of a device 100 according to an embodiment of the present invention for acoustic monitoring of a monitoring area 110. The device 100 may comprise a first sensor system 120 comprising a first acoustic sensor 122, a first processor 124, and first transmission means 126, which system may be mounted at a first location of the monitoring area 110, and a second sensor system 130 comprising a second acoustic sensor 132, a second processor 134, and second transmission means 136, which system may be mounted at a second location of the monitoring area 110 that is different from the first location. The first acoustic sensor 122 or the second acoustic sensor 132 may be a passive acoustic sensor (such as a microphone), for example, in which a noise generated by an observed operation/process/activity in the monitoring area 110 itself (e.g. the sound event 140) is evaluated. Alternatively, the first acoustic sensor 120 and the second acoustic sensor 130 may be an active acoustic sensor. An active acoustic sensor may, for example, generate an ultrasonic field that is influenced by the observed operation/process/activity in the monitoring area 110 (e.g. sound event 140). For example, changes in the monitoring area 110 may be detected from sound reflections.

According to an embodiment, in the first sensor system 120 the first acoustic sensor 122, the first processor 124 and the first transmission means 126 are connected to one another. Similarly, in the second sensor system 130, the second acoustic sensor 132, the second processor 134 and the second transmission means 136 may be connected to one another. For example, the acoustic sensor 122, 132 may be connected to the processor 124, 134, and the processor 124, 134 may be connected to the transmission means 124, 136.

According to an embodiment, the first sensor system 120 or the second sensor system 130 may be battery- or accumulator-operated. Thus, the first sensor system 120 or the second sensor system 130 may work self-sufficiently and may therefore be mounted individually in the monitoring area 110 on the basis of the monitoring area 110. For example, no external power supply is required, so that even monitoring areas 110 which have no power supply for the device 100 may be monitored by means of the device 100.

Furthermore, the device 100 may have a central evaluation means 150, which is connected to the first transmission means 126 and the second transmission means 136, for example by cable, or is configured to wirelessly communicate with the first transmission means 126 and the second transmission means 136 according to a mobile radio protocol.

According to an embodiment, the first processor 124 may be configured to classify a first audio signal 142 detected by the first acoustic sensor so as to obtain a first classification result, and the second processor 134 may be configured to classify a second audio signal 144 detected by the second acoustic sensor 132 so as to obtain a second classification result. For example, the first audio signal 142 and the second audio signal 144 may have the same sound event 140 as their source. However, it is also possible that the first audio signal 142 is generated by a sound event 140 different from that which generates the second audio signal 144; the two different sound events may differ in terms of their positions in the monitoring area 110, for example.

According to an embodiment, the first classification result and the second classification result may be configured to indicate appliances in the monitoring area, activities in the monitoring area, volumes in the monitoring area, phases of a process in the monitoring area, or a match of at least part of the first audio signal 142 or of the second audio signal 144 with a predetermined classification result. For example, the sound event 140 that causes the first audio signal 142 and the second audio signal 144 may be a milling noise, whereby the first classification result and the second classification result indicate, for example, a milling machine (appliance in the monitoring area 110). For example, an activity in monitoring area 110 may be seen to be a car, truck or train passing the first sensor system 120 or the second sensor system 130 in monitoring area 110. An activity in the monitoring area may also be understood to be actions like drilling, milling, turning, grinding, sawing, planing, etc. If the processor 124, 134 is to classify according to volume, the first classification result and the second classification result may indicate, e.g., an exact volume or a categorization into a volume group. If classification is into phases of a process, for example, a single machine (e.g. a robot that may perform several actions) may be monitored. For example, a machine may perform several different actions, each of which may send out a different sound event 140, whereby the respective sound event 140 can be associated with a certain phase in which the appliance, the machine is currently working. For example, a machine may have the phases of positioning of a workpiece, CNC machining of the workpiece, welding of the workpiece to another workpiece, cooling the workpiece, and transferring of the workpiece. However, phases of a process may also include different phases, for example of a construction process on a building site. In this way, the device 100 may monitor, for example, whether different construction phases proceed correctly in terms of time and space.

For example, the first classification result or the second classification result may be a classification result for a construction site event, which may be formed as a group containing a tool noise, a hammering noise, a sawing noise, a drilling noise, a pneumatic hammering noise, a measuring device noise, a machine noise, a burden chain noise, a concrete mixing noise, a concrete casting noise, an excavator noise, a roller noise, a material unloading noise, a tear-down noise or a scaffolding noise. All enumerations of possible first classification results or second classification results listed herein are to be regarded as exemplary and not conclusive.

According to an embodiment, the monitoring area 110 may thus be a construction site, a factory building with machines, a machine, or an inhabited place or part of an inhabited place. All enumerations for the possible monitoring area that are listed here are to be regarded as exemplary rather than exhaustive.

According to an embodiment, the first transmission means 126 may be configured to transmit the first classification result to the central evaluation means 150, and the second transmission means 136 may be configured to transmit the second classification result to the central evaluation means 140. The central evaluation means 150 may be configured to receive the first classification result and the second classification result and to generate a monitoring output 152 for the monitoring area 110 as a function of the first classification result and the second classification result.

According to an embodiment, the first acoustic sensor 122 may be configured to measure a first level of the first audio signal 142, and the first transmission means 126 may be configured to transmit the first level to the central evaluation means 150. Thus, for example, it is possible to monitor, with the device 100 in the monitoring area 110, whether level limit values within the monitoring area 110 are adhered to. The first level may also be used to monitor whether fluid piping systems, e.g., are working properly. For example, the first sensor system 120 or the second sensor system 130 may be mounted on the piping system to detect, for example, a continuous noise of the fluid through the piping. If, for example, there is a narrowing of the pipe (e.g. due to lime deposits, dirt, etc.), the first level of noise may change. Even if, for example, there are holes in the pipes, the first level may change and, thus, the device 100 may be used to conclude that there are non-functional pipes. Optionally, the first level may also be used to monitor, by means of the device 100, velocities of the fluid within the pipe, or velocities at which the fluid exits the pipe system from nozzles, or nozzle contamination (e.g., nozzle functionality).

According to one embodiment, the second acoustic sensor 132 may additionally be configured to measure a second level of the second audio signal 144, and the second transmission means 136 may be configured to transmit the second level to the central evaluation means 150. The central evaluation means 150 may, for example, be configured to spatially locate a source (e.g. the sound event 140) of the first audio signal 142 and of the second audio signal 144 in the monitoring area 110 as a function of the first level and of the second level, while using information about the first location and information about the second location, when the first classification result (coming from the first transmission means 126) matches the second classification result (e.g. received from the second transmission means 136). According to FIG. 1, for example, the source 140 of the first audio signal 142 and of the second audio signal 144 is located closer to the first sensor system 120 than to the second sensor system 130, so that the first level is higher than the second level, for example. Thus, the central evaluation means 150 may conclude, from a combination of the first level and of the second level, how far the source of the first audio signal 142 and of the second audio signal 144 is positioned, e.g., from the first sensor system 120 and the second sensor system 130, and may additionally spatially locate the source 140 very accurately or exactly in the monitoring area 110 by using the information about the first location (of the first sensor system 120) and the information about the second location (of the second sensor system 130).

According to an embodiment, the first level and the second level are used for locating the source 140 in the monitoring area 110 only if the first classification result matches the second classification result. This ensures that the first audio signal 142 and the second audio signal 144 have a common source and that, thus, both levels (the first level and the second level) may be used for localization. For example, if the first acoustic sensor 122 detects the first audio signal 142a from the source 140a, and the second acoustic sensor 132 detects the second audio signal 144b from the source 140b, the location of the source 140a will be different from the location of the source 140b. If, for example, the second sensor system 130 does not detect a second audio signal 144a from the source 140a, and the first sensor system 120 does not detect a first audio signal 142b from the source 140b, the first sensor system 120 may, for example, obtain a first classification result indicating that drilling was performed at the source 140a, and the second sensor system 130 may obtain a second classification result indicating that hammering was performed at the source 140b, for example, which makes the first classification result different from the second classification result, and thus the central evaluation means 150 may only roughly locate, for example, the source 140a and the source 140b in the monitoring area 110 since the central evaluation means 150 may thus only determine that the source 140a is arranged outside the detection area of the second sensor system 130 at a distance from the first sensor system 120 which is dependent on the first level, and that the source 140b is arranged outside the detection area of the first sensor system 120 at a distance from the second sensor system 130 which is dependent on the second level. Thus, localization is possible even with different classification results.

According to an embodiment, the central evaluation means 150 is configured to indicate, in the monitoring output 152, when an upper limit value is exceeded by the first level. Thus, the central evaluation means 150 may ascertain, for example, if activities, processes, phases in the monitoring area 110 are too loud, and may thus inform the user of the device that the sound event 140 should be attenuated.

According to an embodiment, the first acoustic sensor 122 may be configured to detect the first audio signal 142 and to measure a first level of the first audio signal 142 and to set the first processor 124 or the first transmission means 126 from a sleep mode to an operating mode only when a lower limit value for the first level is exceeded. The first processor 124 may be configured to determine the first classification result in the operating mode only, or the first transmission means 126 may be configured to perform transmission in the operating mode only. The first transmission means 126 or the first processor 124 may be configured to consume less power in the sleep mode than in the operating mode. For example, only the first acoustic sensor 122 is in a continuous operating mode (e.g. measurements at several points in time at periodic intervals or stochastically within a period of time, or continuous measurement of the first audio signal 142 within a period of time) and is configured to set the first processor 124 and the first transmission means 126 from a sleep mode to the operating mode only if, for example, an acoustic event has a higher level than the background noise detected in the operating mode of the first sensor system 120, which background noise is below the lower limit value, for example. For example, since the first processor 124 and the first transmission means 126 are only in a "stand-by" mode in the sleep mode and do not perform any actions but only wait for the acoustic sensor to be switched to an operating mode, less energy is consumed in the sleep mode than in the operating mode.

According to one embodiment, the first acoustic sensor 122 may be configured to detect the first audio signal 142, to measure a first level of the first audio signal 142, and to set the first processor 124 or the first transmission means 126 in such a manner that the first classification result will be determined by the first processor 124 and be transmitted to the central evaluation means 150 via the first transmission means 126 if the first level is higher than a lower limit value, and that no first classification result will be determined by the first processor 124 and be transmitted to the central evaluation means 150 by means of the first transmission means 126 if the first level is less than or equal to the lower limit value. Thus, for example, as long as the first acoustic sensor 122 measures only acoustic noise below or equal to the lower limit value, no further steps such as classification by the first processor 124 or transmission of the first classification result to the central evaluation means 150 by means of the first transmission means 126, for example, will be initiated. However, if the first acoustic sensor 122 measures a first level greater than the lower limit value, the device 100 may conclude that the first audio signal 142 belonging to the first level is associated with an acoustic event 140 which describes an activity, process or phase in the monitoring area 110. Thus, the first acoustic sensor 122 may initialize that the first detected audio signal 142 is classified by the first processor 124 and that the first classification result thus obtained is transmitted to the central evaluation means 150 by the first transmission means 126. This may prevent, for example, that the first processor 124 tries to classify a first audio signal 142 without information content and possibly obtains a first classification result, even though the first audio signal 142 does not comprise any information content. This feature thus ensures that an error rate of the first processor 124 or of the central evaluation means 150 is reduced, thus increasing the accuracy of the device for monitoring the monitoring area 110.

According to an embodiment, the first audio signal 142 detected by the first acoustic sensor 122 may be a superposition of at least two sound events (e.g. sound event 140 and sound event 140a). The first processor 124 may be configured to apply a source separation algorithm to the first audio signal 142, 142a so as to classify the at least two sound events or to obtain a first source signal and a second source signal which represent the at least two sound events so as to classify the first source signal and the second source signal.

According to an embodiment, the first processor 124 may be configured to classify the first audio signal 142, 142a, 142b, detected by the first acoustic sensor 122, the first audio signal 142, 142a, 142b in a time/frequency representation to obtain a first classification result. Since different sound events 140, 140a, 140b may also have different time/frequency representations, the time/frequency representation may be used to simplify classification by the first processor 124, for example, since it is now the time/frequency representation that should be analyzed by the first processor 124 rather than the entire first audio signal, which may also represent superpositions of several sound events, for example. By converting the first audio signal 142, 142a, 142b to the time/frequency representation by the first processor 124, the classification may be accelerated within the first processor or by means of the first processor 124, whereby, e.g., the device 100 may already generate a monitoring output for the monitoring area 110 after a very short time.

According to an embodiment, the first transmission means 126 may be configured to transmit the first classification result with first local or temporal information to the central evaluation means 150, and the central evaluation means 150 may be configured to generate the first classification result in connection with the first local and temporal information as monitoring output 152 for the monitoring area 110. Thus, the first classification result may be associated, for example, with local information such as the source 140, 140a, 140b of the first audio signal, an area in which the source 140, 140a, 140b is located, with the first location where the first sensor system 120 may be mounted or where a sensor ID may be mounted which may be associated with the first sensor system 120, and with temporal information, such as with a time stamp for a point in time when the first acoustic sensor 122 has detected the first audio signal 142, or for the point in time when the first transmission means 126 has transmitted the first classification result to the central evaluation means 150. The monitoring output 152 may thus indicate when and where the first classification result occurred in the monitoring area 110. Thus, the device 100 is configured, for example, to accurately monitor the monitoring area 110 in terms of time and location.

According to an embodiment, the central evaluation means 150 may have a memory 154 for storing a specified process schedule plan that shows a series of activities in the monitoring area 110. The specified process schedule plan may be individually specified by the user of the device 100 and stored in the memory 154. The specified process schedule plan may define which events are to take place in the monitoring area 110 within a specified period of time and, thus, are to be detected by the first monitoring system 120 or the second sensor system 130, for example. The central evaluation means 150 may also have a processor 156 for arranging the first classification result and the second classification result in an order defined by spatial or temporal information about the first sensor system 120 or the second sensor system 130. The first classification result and the second classification result may indicate the activities (actions, events, processes, phases) taking place in the monitoring area 110. The central evaluation means 150 is configured, for example, to compare the specified process schedule plan with the arranged first and second classification results (e.g. order) and to generate a monitoring output 152 as a function of a result of the comparison. This feature enables the device 100 to monitor the monitoring area 110, for example, in terms of whether a specified process schedule plan is being adhered to. For example, the central evaluation means 150 may indicate, in the monitoring output 152, to what extent the order and/or the arranged first and second classification results deviate from the specified process schedule plan.

According to an embodiment, the monitoring output 152 may indicate a difference between the specified process schedule plan and the arranged first and second classification results.

According to an embodiment, the first sensor system 120 may be configured to continuously detect the first audio signal 142, 142a, 142b, 144, 144a, 144b by means of the first acoustic sensor 122, 132 in order to classify the first audio signal 142, 142a, 142b, 144, 144a, 144b in the first processor 124, 134 within a first maximum time period, said first maximum time period being shorter than five seconds (the first maximum time period may also be shorter than three minutes, two minutes, one minute, or half a minute), and the first transmission means 126, 136 may be configured to transmit the first classification result (e.g. the first classification result and the second classification result) to the central evaluation means 150 within a second maximum time period, said second maximum time period being shorter than five seconds (the second maximum time period may also be shorter than three minutes, two minutes, one minute or half a minute). Thus, the first sensor system 120 may detect, classify and transmit the audio signal 142, 142*a*, 142*b*, 144, 144*a*, 144*b* very quickly, allowing the device 100 to acoustically monitor the monitoring area 110 in real time, for example.

According to an embodiment, the first sensor system 120 may be configured to obtain the first classification result at a first point in time and at a second point in time by means of the first processor 124 and to transmit it to the central evaluation means 150 by means of the first transmission means 126, wherein the central evaluation means 150 may be configured to order and indicate the first classification result of the first point in time and the first classification result of the second point in time, as a function of the first point in time or the second point in time. Indicating here may be understood as generating the monitoring output for the monitoring area.

According to an embodiment, the first transmission means 126 may be configured to transmit to the central evaluation means 150 an identification of the first sensor system 120 together with the first classification result. The second transmission means 136 may be configured to transmit to the central evaluation means 150 an identification of the second sensor system 130 together with the second classification result. The central evaluation means 150 may have a memory 154, said memory comprising an association of the identification of the first sensor system 120 with the first location and of the identification of the second sensor system with the second location. The central evaluation means 150 may be configured to determine the first location on the basis of the identification of the first sensor system from the memory 154 and to determine the second location on the basis of the identification of the second sensor system from the memory 154 and to spatially locate a first source area of the first audio signal 142 and a second source area of the second audio signal 144 in the monitoring area on the basis of the first location, the second location, the first classification result or the second classification result.

According to an embodiment, the first transmission means 126 may be configured to transmit only the first classification result or a processed first audio signal 142 to the central evaluation means 150, and the second transmission means 136 may be configured to transmit only the second classification result or a processed second audio signal 144, 144*a*. 144*b* to the central evaluation means 150. A processed audio signal may be, for example, an audio signal that has been distorted, so that, for example, speech is no longer understandable but the processed audio signal may be classified by the central evaluation means 150, for example, and, despite the distortion, may still recognize which activities, processes, events, phases have occurred in the monitoring area 110. However, a processed audio signal may also define a signal from which, for example, speech formants have been filtered out, which means that no audio signals that linguistically intelligible are transmitted to the central evaluation means 150.

According to an embodiment, the first transmission means 126 may be configured to transmit a first signal to the central evaluation means 150 only if the first classification result matches a first predetermined classification result. Similarly, the second transmission means 136 may be configured to transmit a second signal to the central evaluation means 150 only if the second classification result matches a second classification result. The first signal or the second signal may be, for example, a logical 1, a ping, or a characteristic signal indicating that the first classification result matches the first predetermined classification result and the second classification result matches the second predetermined classification result, respectively. The central evaluation means 150 may be configured to count how many times per time period the first sensor system 120 has determined the first predetermined classification result (here, for example, the number of times the first signal is transmitted to the central evaluation means 150 is counted) or how many times per time period the second sensor system 130 has determined the second predetermined classification result (here, for example, the central evaluation means 150 counts how many times the second signal has been transmitted to the central evaluation means 150).

According to an embodiment, the first predetermined classification result and the second predetermined classification result may be a classification result for a vehicle (car, bus, truck, train (possibility of differentiation between freight train/passenger train), airplane, bicycle, etc.). The monitoring area 110 may be a road, a road network or a rail network. Therefore, the first sensor system 120 or the second sensor system 130 may be mounted to roads or rails, for example. The central evaluation means 150 may be configured to provide capacity utilization of the monitoring area per location or per group of locations. For example, a road network may be acoustically monitored with the device 100, and the central evaluation means 150 may be configured to count how often the first signal or the second signal is transmitted to the central evaluation means 150 in order to determine how many cars, buses or trucks pass the first sensor system or the second sensor system. Here, for example, the first sensor system may typically send a first signal when a car passes (the first predetermined classification result is a car), or the second sensor system may typically send a second signal to the central evaluation means 150 when a truck passes the second sensor system 130 (the second predetermined classification result in this case is a truck, for example). Thus, for example, the device 100 may be used to perform a traffic census or to monitor capacity utilization of the road network of the road. For example, the device 100 may be used to monitor the road network at an airport where both airplanes and buses as well as other transport vehicles are moving about.

According to an example, the device 100 may be used on construction sites. Various causes may lead to delays in planned processes on construction sites (dependencies between construction phases, delivery bottlenecks and delays, etc.). Construction delays may lead to high financial losses (e.g. claims for damages, etc.). To avoid this, the device 100 may be used on construction sites to check planned processes such as a predetermined process schedule plan, for example, and to detect possible delays or causes of delays while using the device 100, for example in that the central evaluation means 150 is configured to be able to compare detected processes with the specified process schedule plan and, thus, to detect deviations.

On large construction sites, different construction phases often run parallel in terms of space and time. This may be a technical challenge, as several sounds created by construction activities that are often carried out simultaneously may superimpose. By means of the device 100, for example, a source separation algorithm may be applied to the captured audio signal in a processor 124, 134 of the first sensor system or the second sensor system 130 in order to separate superpositions and to be able to associate them with individual noise sources and, thus, to classify the individual noise sources within the audio signal individually by means of the processor 124, 126 and, thus, to simultaneously capture and monitor several parallel activities, processes and phases on a construction site. The device 100 enables precisely timed process monitoring of the construction phases and associated activities with only little expenditure and simple logistic feasibility.

According to an example, the device 100 comprises a distributed sensor system, e.g. consisting of a first sensor system 120 at a first location and the second sensor system 130 at the second location, for continuous audio capturing at one or several positions within a construction site. The device 100 is not limited to the first sensor system 120 and the second sensor system 130, but may have further sensor systems such as, e.g., a third sensor system, a fourth sensor system, a fifth sensor system, a sixth sensor system and an eighth sensor system comprising the same features as the first sensor system 120 or the second sensor system 130.

In other words, according to one embodiment, a real-time analysis may be performed of the audio data (e.g. the audio signals 142, 142a, 142b, 144, 144a, 144b) on the sensors (e.g. the first sensor system 120 or the second sensor system 130) and transmission of the analysis results (e.g. of the classification result or of the second classification result) to a central server (e.g. the central evaluation means 150) via mobile radio for comprehensive evaluation (e.g. long-term evaluation).

According to an embodiment, a conversion of the audio signal 142, 142a, 142b, 144, 144a, 144b to a time/frequency representation (e.g. by means of short-term Fourier transformation) may be performed at each sensor (e.g. the first sensor system 120 and the second sensor system 130). As an option, automatic classification of several sound events 140, which may be associated with certain construction phases/activities (e.g. hammer blow, cordless drill, burden chain unloading), may be performed in the first sensor system 120 or the second sensor system 130. Said automatic classification may be performed, e.g., by the first processor 124 or the second processor 134. According to an embodiment, automatic classification may be performed via a time/frequency representation (e.g. spectrogram) combined with an automatic classification algorithm (e.g. neuronal networks), wherein characteristic sound patterns may be learned or recognized via a time/frequency representation combined with an automatic classification algorithm. This also allows simultaneous recognition of several active activities which superimpose one another correspondingly in sound.

According to an embodiment, active construction phases (at different positions within the construction site (e.g. the monitoring area 110)) may be derived and temporally documented on the basis of the detected sound events 140, 140a, 140b. Thus, for example, the first processor 124 or the second processor 134 may associate a first classification result or a second classification result with a first audio signal or a second audio signal, respectively, which classification result may indicate an active construction phase, and additionally, for example, the first transmission means 126 or the second transmission means 136 may transmit a time stamp to the central evaluation means 150 with the first classification result or the second classification result, respectively, so that temporal documentation is implemented. In the memory 154 of the central evaluation means 150, for example, a specified process schedule plan may be stored, which specified process schedule plan may, for example, comprise an association between construction phases and associated activities or positions within the construction site (the monitoring area 110) by providing expertise (e.g. to the user of the device 100). Thus, activities detected by the first sensor system 120 or the second sensor system 130 may be compared, in the central evaluation means 150, with the specified process schedule plan. This enables precisely timed tracking of the construction progress. By the automatic comparison with the construction plan (e.g. the specified process schedule plan), possible delays may be spatially and temporally identified in the monitoring area 110 by means of the device 100.

In the following, further advantageous embodiments will be described, in particular, in addition or alternatively to the above explanation.

According to one embodiment, the first sensor system 120 or the second sensor system 130 may be configured to perform additional measurements of sound levels (e.g. the first level or the second level) at the individual sensors (e.g. the first acoustic sensor 122 or the second acoustic sensor 132). Here, for example, temporal filtering is useful, so that these levels are stored/analyzed during active activities only. For example, the first processor 124 or the second processor 134 will be switched from a sleep mode to an operating mode if the first acoustic sensor 122 or the second acoustic sensor 132 detects an active activity (e.g. a level exceeding a lower limit value).

According to an embodiment, the temporally measured sound level values may be used to precisely locate the activity on the construction site (e.g., the monitoring area 110) if the same sound event (e.g., a match between the first classification result and the second classification result) is detected as active at several spatially adjacent sensors (e.g., the first sensor system 120 and the second sensor system 130). Optionally, exact spatial localization of the activity in the monitoring area 110 may be effected by runtime/correlation analyses, for example. Said spatial localization may be performed by the central evaluation means 150, for example.

Thus, according to an embodiment, different activities may be detected in a spatially located and precisely timed manner across the entire spatial extension of a construction site (e.g. the entire monitoring area 110).

In the following, still further advantageous embodiments will be described, in particular, in addition or alternatively to the above explanation.

According to one embodiment, compliance with (statutory) noise regulations may be systematically monitored and documented by means of continuous and spatially distributed measurement of sound levels (e.g. by the first acoustic sensor 122 or the second acoustic sensor 132). If limit values (e.g. the lower limit value) are exceeded, the analysis results (e.g. of the monitoring output 152) may be used to identify specific causes in order to eliminate them. For example, the device 100 may be used to ascertain, in the monitoring area 110, the points at which there is particularly high noise exposure (e.g. a level of an audio signal exceeds the lower limit value) and the cause that is to be attributed to this increased volume.

In the following, effects and advantages of the embodiments described herein (e.g. of the embodiments described above and the embodiments described below) will be explained.

According to one embodiment, the device 100 may be configured to perform precisely timed and spatial process monitoring of construction phases and related activities on construction sites (e.g. monitoring area 110) of any size. Depending on the size, for example, the number of sensor systems used may vary. For example, for a larger monitoring area 110, more sensor systems should be mounted in the monitoring area than for a smaller monitoring area.

The device 100 offers a low-cost technical solution due to low costs of the distributed sensor systems (e.g. of the first sensor system 120 or of the second sensor system 130) comprising, e.g., a simpler microphone system and simpler server components (e.g. the first processor 124 or the second processor 134) for analysis tasks.

According to an embodiment, the first processor 124 or the second processor 134 may be individually adapted to the monitoring area 110 or to the requirements of the user for the monitoring area 110. For example, the first processor 124 or the second processor 134 is readily adaptable to new classes/local acoustic conditions (environmental noises etc.)/classification results by re-training the classification models. Thus, the device 100 and a method of acoustic process monitoring of construction sites or of acoustic monitoring of other scenarios may be employed.

According to one embodiment, sound recognition on the sensor nodes (e.g. in the first processor 124 or the second processor 134) may be used to prevent real audio capturing from being transmitted/stored for a long time, which makes it easier to meet data protection requirements (e.g. avoidance of possible speech recognition).

According to one embodiment, the device 100 may be used on a construction site. Here, a possible application scenario may be classification of construction site vehicles passing the sensor in order to precisely monitor the logistics of construction material delivery. For this purpose, for example, a material transporter may be stored in the first processor 124 or the second processor 134 as a specified classification result. If the first processor 124 or the second processor 134 recognizes the specified classification result, for example in the audio signal recorded by the first acoustic sensor 122 or the second acoustic sensor 132 (e.g. in the first audio signal or the second audio signal), the first transmission means 126 or the second transmission means 136 may send a logical 1, a ping or a characteristic signal to the central evaluation means 150, which then counts this received signal for the monitoring area 110.

Another possible application scenario is monitoring of working times of stationary machines on the construction site (e.g. the concrete pump) or in factories (e.g. robots) to analyze material logistics/the equipment level of the machines.

Figure 2:
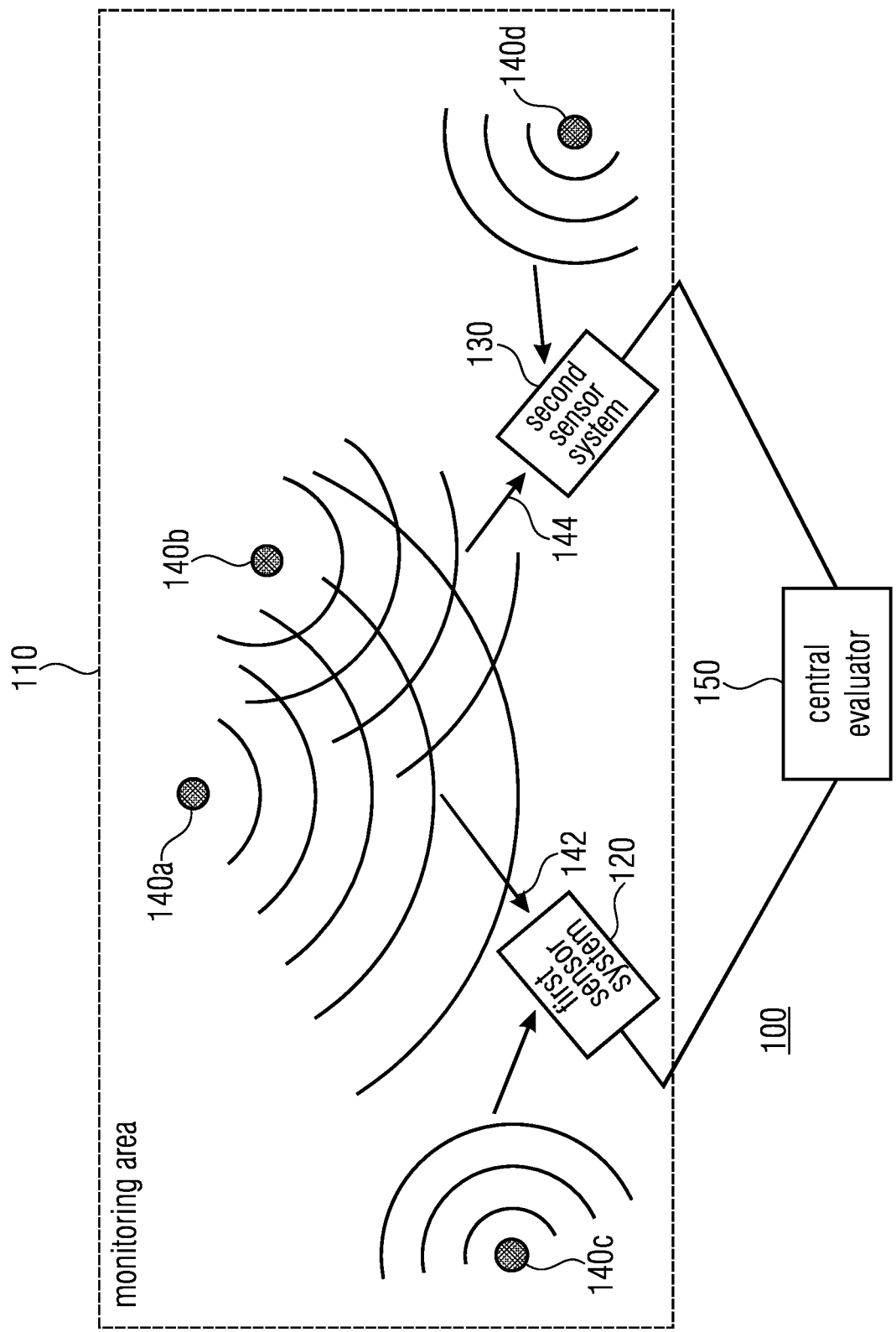
FIG. 2 shows a schematic representation of a device configured to detect at least two sound events in a monitoring area according to an embodiment of the present invention.

According to an embodiment of the device 100, not only construction sites may be acoustically monitored with the device 100 as described above, but also other scenarios, such as a traffic census or monitoring or condition monitoring of machines on construction sites or other locations, FIG. 2 shows a schematic representation of the device 100 according to an embodiment of the present invention. The device 100 may have the same features and functionalities as the device 100 in FIG. 1. For example, the device 100 of FIG. 2 comprises the first sensor system 120, the second sensor system 130 and the central evaluation means 150. By means of the device 100, the monitoring area 110 may be monitored acoustically.

According to an embodiment, a first source 140a of a first sound event and a second source 140b of a second sound event may be arranged in the monitoring area 110. The acoustic noise caused by the source 14a and that caused by the second source 140b may be superimposed on each other, allowing the first sensor system 120 to detect a first superimposed audio signal 142 and the second sensor system 130 to detect a second superimposed audio signal 144. In other words, the first audio signal 142 or the second audio signal 144 is, for example, a superposition of at least two sound events (e.g., a first sound event caused by the first source 140a and a second sound event caused by the second source 140b). The first sensor system 120 may have a first processor, and the second sensor system 130 may have a second processor. The first processor may be configured to apply a source separation algorithm to the first audio signal, and/or the second processor may be configured to apply a source separation algorithm to the second audio signal 144 so as to classify the at least two sound events or to obtain a first source signal and a second source signal which represent the at least two sound events so as to classify the first source signal and the second source signal.

The source separation algorithm may, for example, have specific noise signals which may occur, for example, in the monitoring area 110, and may compare these characteristic noise signals with the first audio signal 142 captured by the first sensor system 120 or the second audio signal 144 captured by the second sensor system 130, and may thereby associate, for example, two characteristic noise signals with the first audio signal 142 or with the second audio signal 144, whereby the source separation algorithm may be used to obtain a first classification result or a second classification result directly from the first audio signal 142 or the second audio signal 144, respectively, with for example two classifications (e.g. of the first source 140a and of the second source 140). Alternatively, the source separation algorithm may also first separate the detected audio signal 142, 144 into a first source signal and a second source signal, which correspond to the first source 140a and the second source 140b, respectively. This enables the processor (e.g., the first processor in the first sensor system 120 and the second processor in the second sensor system 130) to classify the first source signal and classify the second source signal in a further step and, thus, to obtain a first classification result or a second classification result, respectively, with two classifications (of the first source signal and of the second source signal).

According to an embodiment, more than two sources for two sound events may be arranged in the monitoring area 110. According to FIG. 2, for example, four sound events with a first source 140a, a second source 140b, a third source 140c and a fourth source 140d may be arranged in the monitoring area 110. For example, the first sensor system 120 may have a detection area large enough that the acoustic sensor in the first sensor system 120 that the first audio signal detected by the first acoustic sensor may detect a superposition of three sound events (of the first source 140a, the second source 140b, and the third source 140c). Similarly, the second sensor system 130 may have an acoustic sensor that has a detection area large enough that the acoustic sensor may detect a superposition of three sound events (of a first source 140a, a second source 140b and a fourth source 140d). Thus, the source separation algorithm in the first processor of the first sensor system 120 as well as the source separation algorithm in the second processor of the second sensor system 130 may be adapted to classify the three sound events or to obtain a first source signal, a second source signal and a source signal which represent the three sound events in order to classify the first source signal, the second source signal and the third source signal.

According to an embodiment, the first sensor system 120 and the second sensor system 130 may measure a first level and a second level of the first audio signal and the second audio signal, respectively, and the central evaluation means 150 may be arranged to spatially locate a source of the first audio signal and of the second audio signal in the monitoring area in case of a match between the first classification result and the second classification result, as a function of the first level and the second level, while using information about the first location and information about the second location. For example, according to FIG. 2, the first classification result of the first sensor system 120 matches the second classification result of the second sensor system 130 in that both have classified the first source 140a and the second source 140b, whereby two of three classifications of the first classification result match two of three classifications of the second classification result. Since the central evaluation means 150 may have information, for example, that the first sensor system 120 is mounted at a first location and the second sensor system 130 is mounted at a second location, the central evaluation means 150 may locate the first source 140a and the second source 140b in the monitoring area 110 on the basis of the information on the first location and of the information on the second location as well as of the level information.

Figure 3:
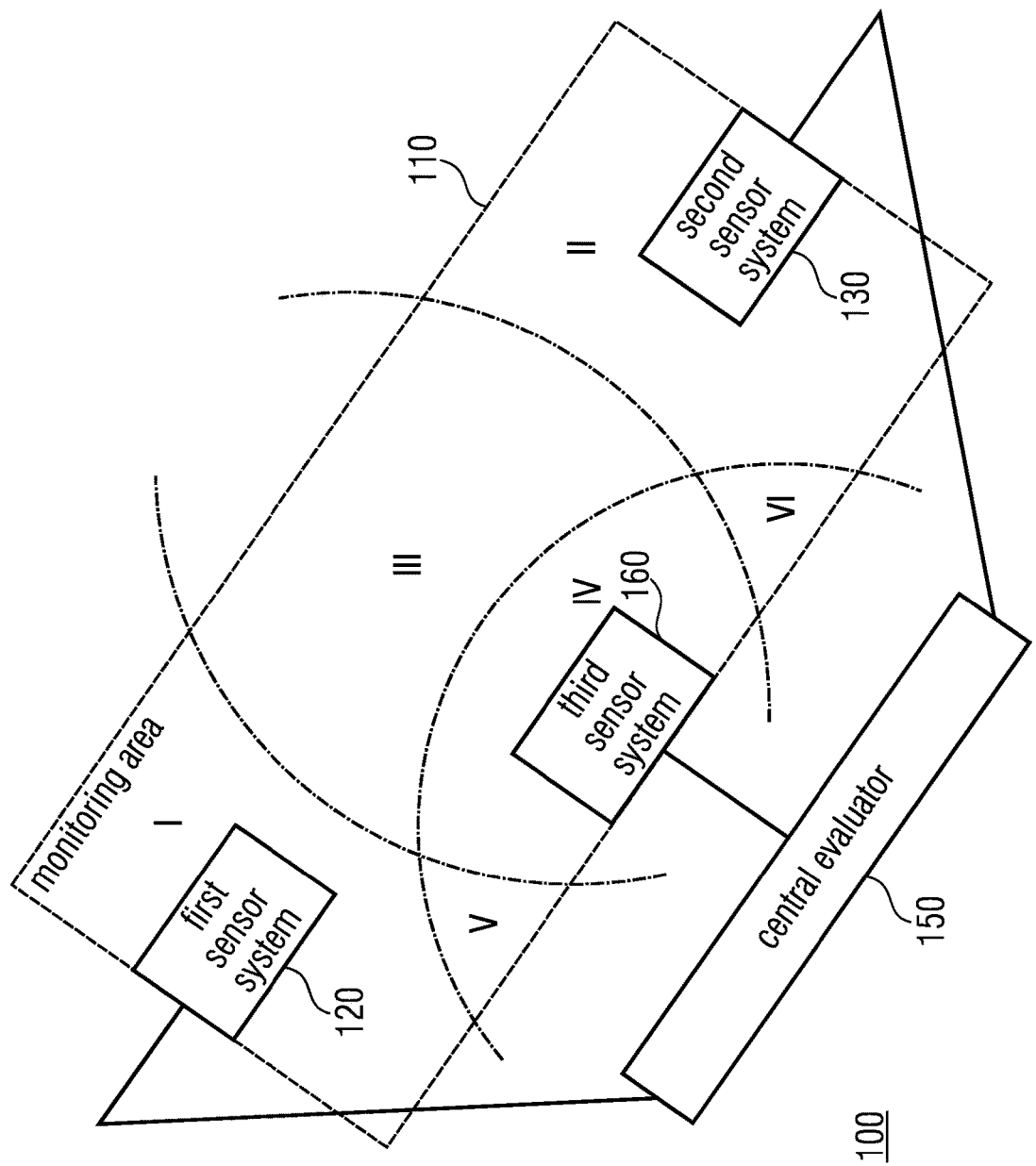
FIG. 3 shows a schematic representation of a device configured to locate sound events in the monitoring area according to an embodiment of the present invention.

FIG. 3 shows a schematic representation of a device 100 comprising a central evaluation means 150, a first sensor system 120, a second sensor system 130 and a third sensor system 160. For example, the first sensor system 120 is located at a first position in the monitoring area 110, the second sensor system 130 is located at a second position in the monitoring area 110, and the third sensor system 160 is located at a third position in the monitoring area 110. The first position, the second position and the third position may differ from one another. According to an embodiment, the third sensor system 160 may have the same features and functionalities as the first sensor system 120 and the second sensor system 130.

According to an embodiment, the central evaluation means 150 may have a memory in which it is stored which sensor system is located at which position in the monitoring area 110. For example, the memory contains an association of a transmission means ID of the first sensor system 120 linked to the first position, of the second sensor system 130 linked to the second position, and of the third sensor system 160 linked to the third position. Optionally, the memory of the central evaluation means 150 may store which areas of the monitoring area 110 are monitored by the first sensor system 120, the second sensor system 130 and the third sensor system 160. For example, the first sensor system 120 may acoustically monitor areas I, III, IV and V, the second sensor system 130 may monitor areas II, III, IV and VI, and the third sensor system 160 may monitor areas IV, V and VI, for example. If, for example, the first classification result of the first sensor system 120 with a first sensor ID is sent to the central evaluation means 150, and a second classification result of the second sensor system 130 with a second sensor ID is sent to the central evaluation means 150, and a third classification result with a third sensor ID is sent from the third sensor system 160 to the central evaluation means 150, the classification results may be associated with individual areas within the monitoring area 110 by the central evaluation means 150.

For example, a sound event that was detected only by the first sensor system 120 may be located only in area I of the monitoring area 110. If a sound event is detected only by the second sensor system 130, the sound event may be located only in area II of the monitoring area 110. If a sound event is detected by both the first sensor system 120 and the second sensor system 130, the sound event may be located only in area III of the monitoring area 110. If a sound event is detected by the first sensor system 120 and the third sensor system 160, this sound event may be located only in area V, and if a sound event is detected by the second sensor system 130 and the third sensor system 160, this sound event will be located in area VI of the monitoring area 110. If both the first sensor system 120, the second sensor system 130 and the third sensor system 160 detect the sound event, the sound event will be located, for example, in area IV of monitoring area 110.

Thus, the device 100 is configured to perform local information within the monitoring area 110 at least in some areas on the basis of an identification of the sensor systems 120, 130, 160.

According to the embodiment in FIG. 3, the first sensor system 120 may have first transmission means which may be configured to transmit to the central evaluation means 150 an identification of the first sensor system 120 with the first classification result, and the second sensor system 130 may have second transmission means which may be configured to transmit to the central evaluation means 150 an identification of the second sensor system 130 with the second classification result. The central evaluation means 150 may have a memory, the memory having an association of the identification of the first sensor system 120 with the first location and of the identification of the second sensor system 130 with the second location. Furthermore, the central evaluation means 150 may be configured to determine the first location on the basis of the identification of the first sensor system 120 from the memory and to determine the second location on the basis of the identification of the second sensor system 130 from the memory and to spatially locate a first source area (e.g. area I, area II, III, IV, V or VI) of the first audio signal and a second source area of the second audio signal in the monitoring area 110 on the basis of the first location, the second location, the first classification result or the second classification result.

Figure 4:
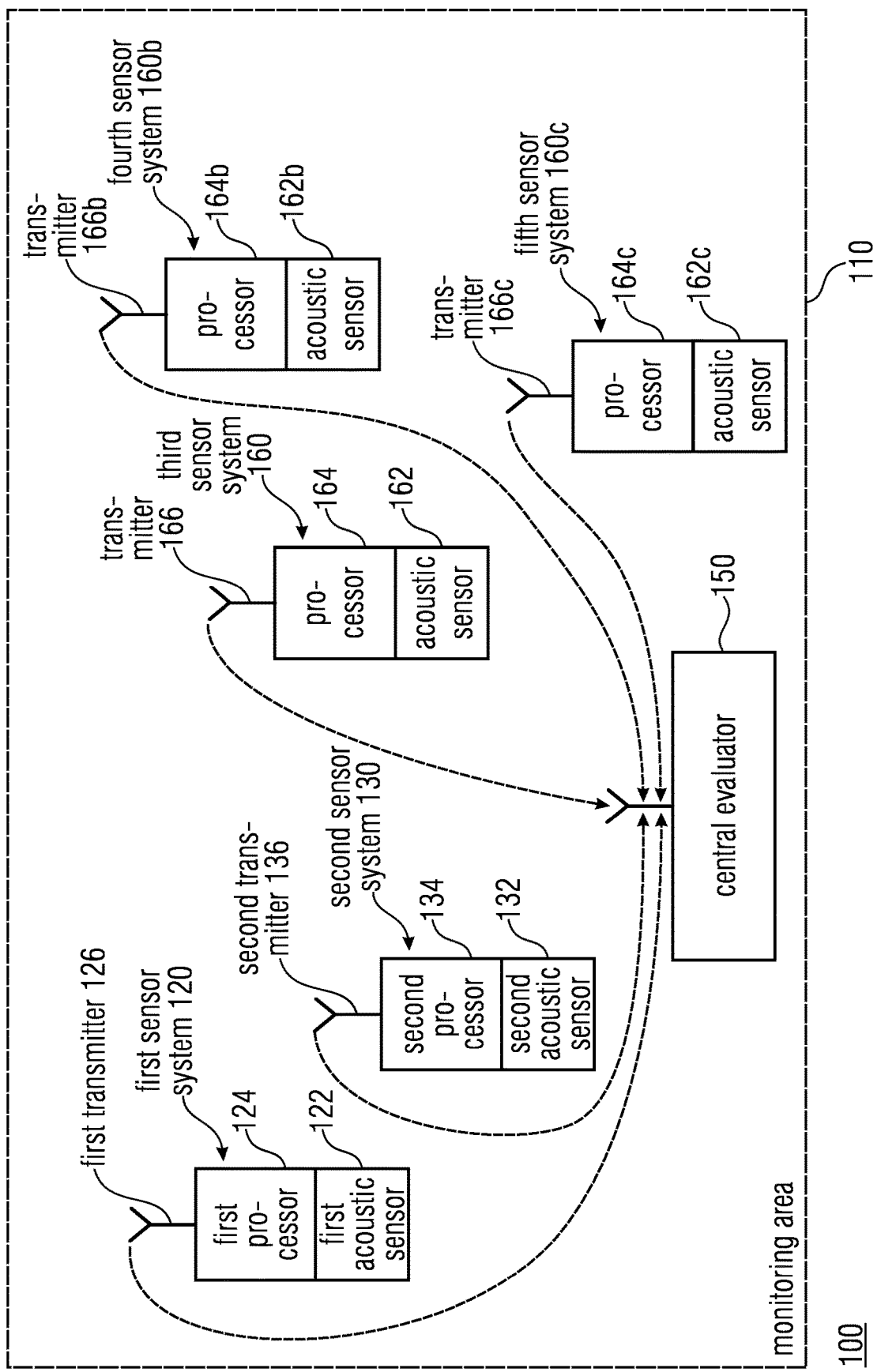
FIG. 4 shows a schematic representation of a device comprising at least five sensor systems according to an embodiment of the present invention.

FIG. 4 shows a schematic representation of a device 100 comprising a central evaluation means 150, a first sensor system 120, which may be mounted at a first location in a monitoring area 110, a second sensor system 130, which may be mounted at a second location of the monitoring area, a third sensor system 160, which may be mounted at a third location of the monitoring area 110, a fourth sensor system 160b, which may be mounted at a fourth location of the monitoring area 110, and a fifth sensor system 160c, which may be mounted at a fifth location of the monitoring area 110. The first sensor system 120, the second sensor system 130, the third sensor system 160, the fourth sensor system 160b, and the fifth sensor system 160c may have the same features and functionalities as the first sensor system 120 and the second sensor system 130 of FIG. 1, FIG. 2 and FIG. 3, and as the third sensor system 160 of FIG. 3.

According to one embodiment, the first sensor system 120 comprises a first acoustic sensor 122, a first processor 124 and first transmission means 126. The second sensor system 130 may have a second acoustic sensor 132, a second processor 134 and second transmission means 136. According to an embodiment, the third sensor unit 160, the fourth sensor unit 160b, and the fifth sensor unit 160c may have an acoustic sensor 162, 162b, 162c, a processor 164, 164b. 164c, and a transmission unit 166, 166b, 116c. According to an embodiment, the acoustic sensor 162, 162b, 162c may have the same features and functionalities as the first acoustic sensor 122 and the second acoustic sensor 132. According to an embodiment, the processor 164, 164b, 164c may have the same features and functionalities as the first processor 124 and the second processor 134. According to one embodiment, the transmission means 166, 166b, 166c may have the same features and functionalities as the first transmission means 126 or the second transmission means 136.

According to one embodiment, the transmission means 166, 166b, 166c, the first transmission means 126, the second transmission means 136 and the central evaluation means 150 are configured to wirelessly communicate with one another in accordance with a mobile radio protocol. This enables mounting the device 100 very easily in a monitoring area since no cables have to be laid between the individual components of the device 100 in order to implement transmission of, for example, classification results. Thus, the individual components of the device 100 may be mounted in the monitoring area 110 independently of one another in a manner in which they are individually adapted to the monitoring area 110, communication and transmission between the individual components of the device 100 is guaranteed.

Figure 5:
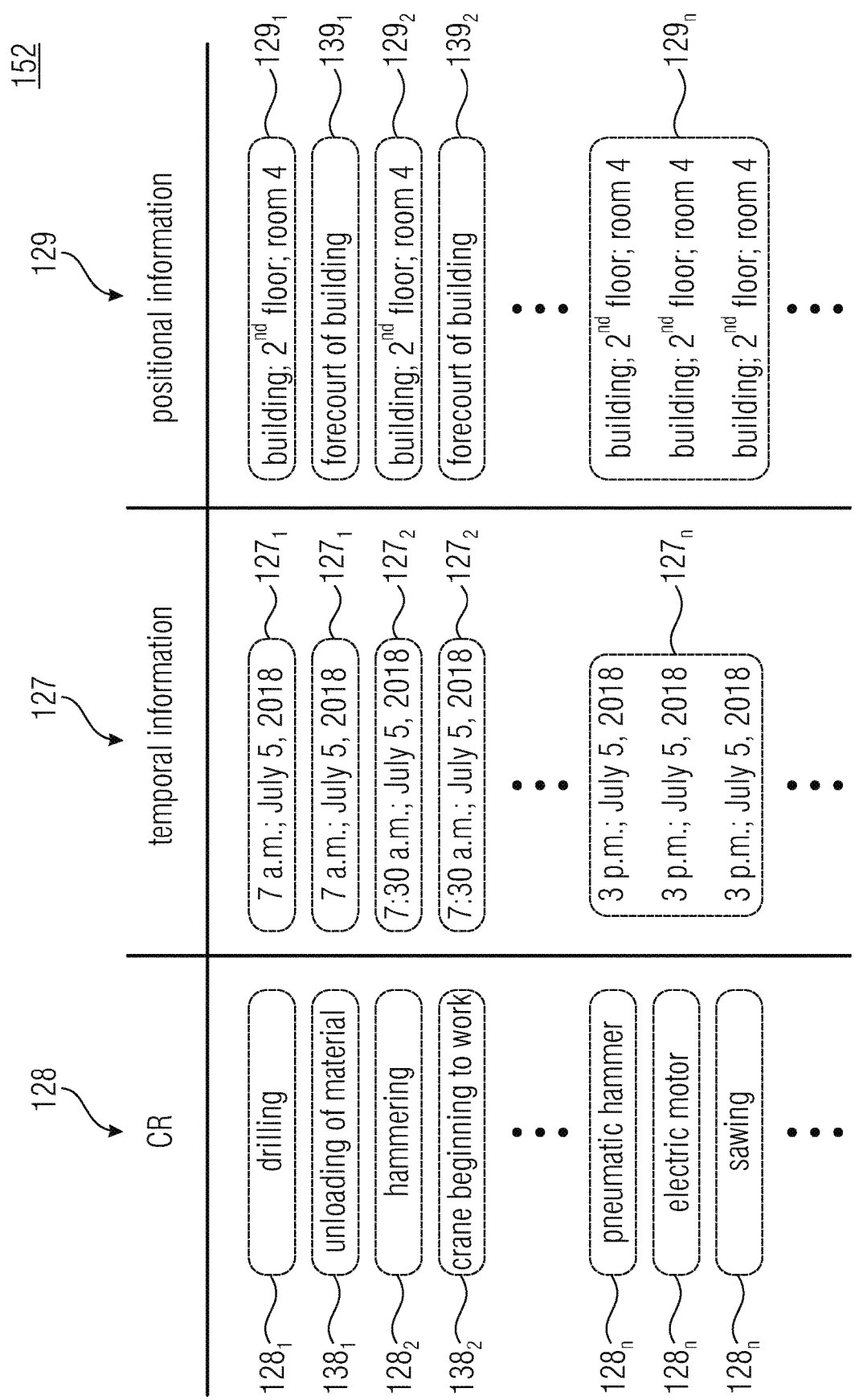
FIG. 5 shows a tabular representation of a monitoring output for the monitoring area, generated by a device according to an embodiment of the present invention.

FIG. 5 shows a tabular representation of a monitoring output 152 for a monitoring area generated by a device. According to an embodiment, a first sensor system of the device may be configured to obtain a first classification result $128_1$ to $128_n$ (where n may be any natural number ≥3) at a first point in time $127_1$, a second point in time $127_2$ and at an $n^{th}$ point in time $127_n$ (where further points in time may occur between the second point in time and the $n^{th}$ point in time n−3) by means of a first processor and to transmit it to a central evaluation means by means of a transmission means. The central evaluation means of the device may be configured to order the first classification result $128_1$ of the first point in time $127_1$ and the first classification result $128_2$ of the second point in time $127_2$, as a function of the first point in time or the second point in time, respectively, and to indicate them in the monitoring output 152, for example. For example, the first classification result $128_1$ (drilling) is ordered to chronologically come before the first classification result $128_2$ (hammering) in monitoring output 152 because the first point in time $127_1$ occurred before the second point in time $127_2$. According to FIG. 5, first classification results $128_1$ to $128_n$ may be obtained with the device 100 at n points in time $127_1$ to $127_n$, which classification results $128_1$ to $128_n$ may be ordered by the evaluation means as a function of a point in time and may be indicated. According to FIG. 5, temporal information or points in time are indicated in a column, together with the time of the day and date.

Optionally, it is also possible to indicate only a time of the day or only a date. The first classification result $128_1$ to $128_n$ may indicate, according to an embodiment, which activities, processes or phases have been performed in a monitoring area. Thus, for example, the monitoring output 152 no longer represents the audio signal captured by an acoustic sensor of the device, but a classification of noises in the audio signal.

According to an embodiment, the first transmission means of the device may be configured to transmit the first classification result $128_1$ to $128_n$ to the central evaluation means together with first local 129 or temporal 127 information. The central evaluation means may be configured to generate the first classification result $128_1$ to $128_n$ in conjunction with the first local 129 and temporal 127 information as the monitoring output 152 for the monitoring area.

According to an embodiment, the device may have not only a first sensor system but also a second sensor system that may generate a second classification result $138_1$, $138_2$. Here, the first sensor system may be mountable at a first location $129_1$ to $129_n$, and the second sensor system may be mountable at a second location $139_1$, $139_2$. According to the embodiment in FIG. 5, the first sensor system and the second sensor system may, for example, simultaneously detect activities, processes, phases in the monitoring area. For example, for the first point in time $127_1$, the central evaluation means receives a first classification result $128_1$ from the first sensor system and a second classification result $138_1$ from the second sensor system. These two classification results $128_1$, $138_1$ may now be sorted according to their local information 129 in the monitoring output 152 since they have the same point in time.

According to an embodiment, a sensor system such as the first sensor system may detect several actions/activities/processes/phases in the monitoring area at the same time $127_n$. Thus, for example, the first classification result 128 for a time $127_n$ may have three classifications (e.g. pneumatic hammer, electric motor and saws). Thus, in the monitoring output 152, for example, all three classifications of the first classification result $128_n$ at the time $127_n$ may be displayed or shown to be connected to the associated local information $129_n$.

For example, the monitoring output 152 may be provided to the user of the device on an external appliance, a mobile device (such as a mobile device or tablet). Thus, the user may use the monitoring output 152 to determine which activities/processes/phases have taken place in the monitoring area over a given period of time. Here the user is shown at which time and at which place within the monitoring area which event has taken place.

According to an embodiment, the tabular representation of FIG. 5 for the classification results 128, the temporal information 127 and the local information 129 may represent an intermediate result of the central evaluation means, which may be compared, for example, with a specified process schedule plan of the monitoring area.

In other words, the central evaluation means of the device may have a memory for storing a specified process schedule plan that contains a series of activities in the monitoring area. Furthermore, the central evaluation means may include a processor for arranging the first classification result $128_1$ to $128_n$ and the second classification result $138_1$, $138_2$ in an order 152 defined by spatial 129 or temporal information 127 about the first sensor system or the second sensor system, the first classification result $128_1$ to $128_n$ and the second classification result $138_1$, $138_2$ indicating the activities in the monitoring area.

According to an embodiment, the central evaluation means may be configured to compare the specified process schedule plan with the arranged first and second classification results (of order 152) and to generate a monitoring output as a function of a result of the comparison. In this case, for example, the monitoring output is not the tabular representation of FIG. 5, but a difference between the specified process schedule plan and the arranged first and second classification results (of order 152).

For example, the second sensor system may detect a crane taking up work at a second point in time $127_2$ at the second location $139_2$ (second classification result $138_2$), although, for example, in the specified process schedule plan this activity should not take place at the second point in time $127_2$. Thus, a monitoring output of the central evaluation means may indicate that the crane has started working at the forecourt $139_2$ of the building at the second point in time $127_2$, or it may only indicate that a difference has occurred between the specified process schedule plan and the arranged first and second classification results.

Figure 6:
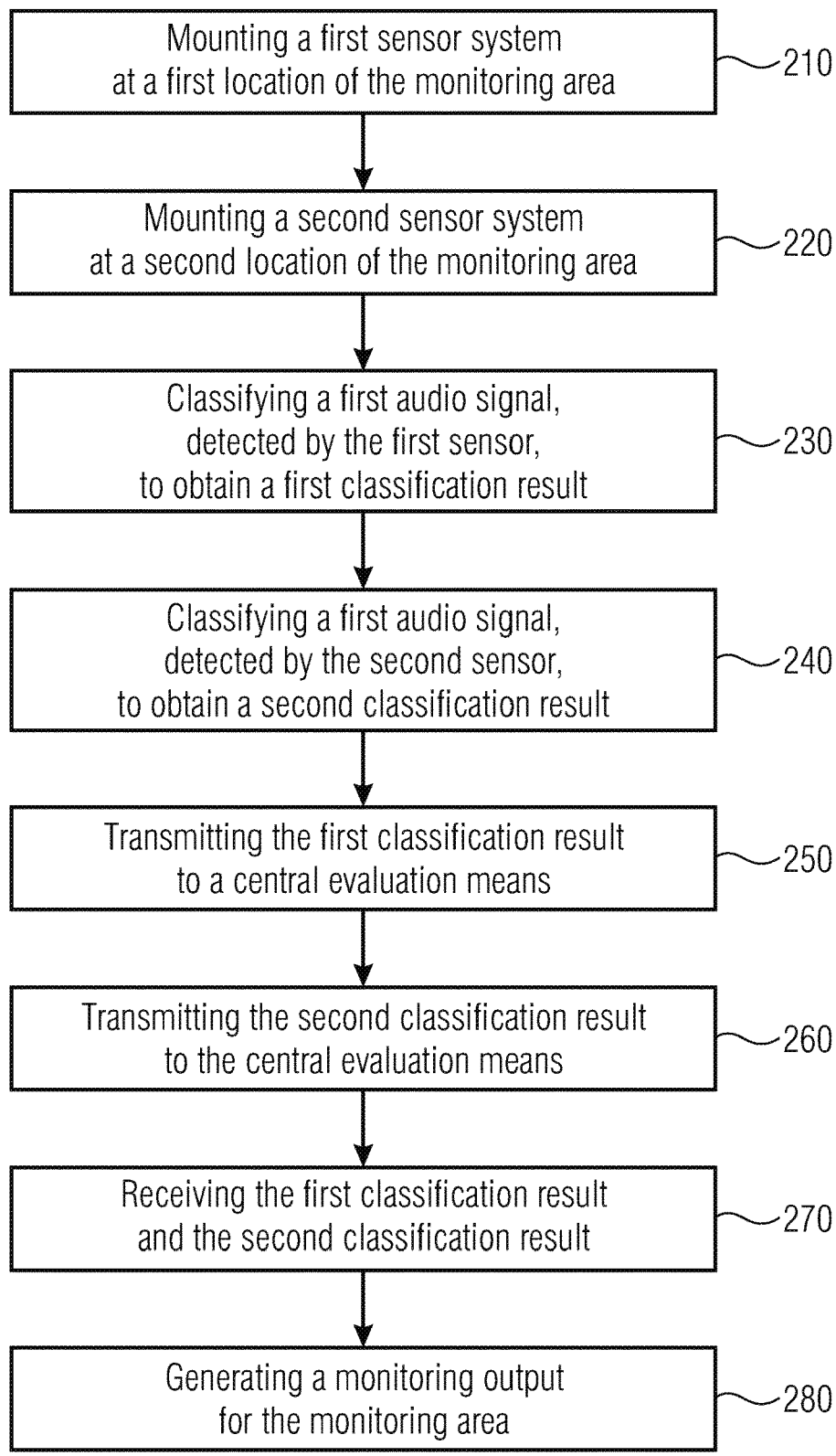
FIG. 6 shows a block diagram of a method of acoustic monitoring of a monitoring area according to an embodiment of the present invention.

FIG. 6 shows a block diagram of a method 200 for acoustic monitoring of a monitoring area. Procedure 200 may have the following steps: mounting 210 a first sensor system comprising a first acoustic sensor, a first processor and first transmission means at a first location of the first monitoring area, mounting 220 a second sensor system comprising a second acoustic sensor, a second processor and second transmission means at a second location of the monitoring area, different from the first location, classifying 230 a first audio signal, detected by the first acoustic sensor, with the first processor to obtain a first classification result, classifying 240 a second audio signal, detected by the second acoustic sensor, with the second processor to obtain a second classification result, transmitting 250 the first classification result to a central evaluation means with the first transmission means, transmitting 260 the second classification result to the central evaluation means with the second transmission means, receiving 270 the first classification result and the second classification result with the central evaluation means, and generating 280 a monitoring output for the monitoring area, as a function of the first classification result and the second classification result, with the central evaluation means. Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium or the computer-readable medium are typically concrete and/or non-transitory and/or non-transient.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. Transmission may be electronic or optical, for example.

The receiver may be a computer, a mobile device, a memory device or a similar device, for example. The device or the system may include a file server for transmitting the computer program to the receiver, for example.

In some embodiments, a programmable logic device (for example, a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or may be a hardware specific to the method, such as an ASIC.

The devices described herein may be implemented, e.g., while using a hardware apparatus or while using a computer or while using a combination of a hardware apparatus and a computer.

The devices described herein or any components of the devices described herein may be implemented, at least partly, in hardware or in software (computer program).

The methods described herein may be implemented, e.g., while using a hardware apparatus or while using a computer or while using a combination of a hardware apparatus and a computer.

The methods described herein or any components of the devices described herein may be implemented, at least partly, by hardware or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] A. Liutkus, D. Fitzgerald, Z. Rafii, B. Pardo, and L. Daudet, "Kernel additive models for source separation," IEEE Trans. Signal Process., vol. 62, no. 16, pp. 4298-4310, 2014

[2] D. Barry, B. Lawlor, and E. Coyle, "Sound source separation: azimuth discrimination and resynthesis," in Proc. 7th Int. Conf. Digital Audio Effects (DAFx'04), Naples, Italy, 2004.
[3] Referenz: C. Avendano, "Frequency-domain source identification and manipulation in stereo mixes for enhancement, suppression and re-panning applications," in Proc. IEEE Workshop Appl. Signal Process. Audio Acoust. (WASPAA), New York, USA, 2003, pp. 55-58.
[4] T. Pratzlich, R. M. Bittner, A. Liutkus, and M. Müller, "Kernel additive modeling for interference reduction in multi-channel music recordings," in Proc. Int. Conf. Acoust. Speech Signal Process. (ICASSP), Brisbane, Australia, 2015, pp. 584-588.

The invention claimed is:

1. A device for acoustic monitoring of a monitoring area, comprising:
a first sensor system comprising a first acoustic sensor, a first processor, and first transmitter, which system is configured to be mounted at a first location of the monitoring area;
a second sensor system comprising a second acoustic sensor, a second processor, and second transmitter, which system is configured to be mounted at a second location of the monitoring area that is different from the first location,
wherein the first processor is configured to classify a first audio signal detected by the first acoustic sensor to achieve a first classification result,
wherein the second processor is configured to classify a second audio signal detected by the second acoustic sensor to achieve a second classification result,
wherein the first transmitter is configured to transmit the first classification result to a central evaluator,
wherein the second transmitter is configured to transmit the second classification result to the central evaluator,
the central evaluator, the central evaluator being configured to receive the first classification result and to receive the second classification result, and to generate a monitoring output for the monitoring area as a function of the first classification result and the second classification result;
wherein the first transmitter is configured to transmit the first classification result comprising first local or temporal information to the central evaluator; and
wherein the central evaluator is configured to generate the monitoring output for the monitoring area, based on the first classification result in conjunction with the first local and temporal information;
wherein the central evaluator comprises:
a memory for storing a predetermined process schedule plan comprising a series of activities in the monitoring area, and
a processor
for arranging the first classification result and the second classification result in an order defined by spatial or temporal information about the first sensor system or the second sensor system, wherein the first classification result and the second classification result indicate activities in the monitoring area;
for comparing the predetermined process schedule plan with the arranged first and second classification results; and
for generating the monitoring output as a function of a result of the comparison.

2. The device as claimed in claim 1, wherein the first acoustic sensor is configured to measure a first level of the first audio signal; and
wherein the first transmitter is configured to transmit the first level to the central evaluator.

3. The device as claimed in claim 2,
wherein the second acoustic sensor is configured to measure a second level of the second audio signal;
wherein the second transmitter is configured to transmit the second level to the central evaluator; and
wherein the central evaluator is configured, when the first classification result matches the second classification result, to spatially locate a source of the first audio signal and of the second audio signal in the monitoring area as a function of the first level and of the second level while using information about the first location and information about the second location.

4. The device as claimed in claim 2, wherein the central evaluator is configured, when an upper limit value is exceeded by the first level, to indicate this exceeding in the monitoring output.

5. The device as claimed in claim 1, wherein the first audio signal detected by the first acoustic sensor is a superposition of at least two sound events; and
wherein the first processor is configured to apply a source separation algorithm to the first audio signal to classify the at least two sound events or to acquire a first source signal and a second source signal which represent the at least two sound events so as to classify the first source signal and the second source signal.

6. The device as claimed in claim 1, wherein the first classification result and the second classification result are configured to indicate used appliances in the monitoring area, activities in the monitoring area, volume levels in the monitoring area, phases of a process in the monitoring area, or a match of at least a portion of the first audio signal or of the second audio signal with a predetermined classification result.

7. The device as claimed in claim 1, wherein the first processor is configured to convert the first audio signal detected by the first acoustic sensor to a time/frequency representation; and
wherein the first processor is configured to classify the first audio signal while using the time/frequency representation to achieve the first classification result.

8. The device as claimed in claim 1, wherein the monitoring output indicates a difference between the predetermined process schedule plan and the arranged first and second classification results.

9. The device as claimed in claim 1, wherein the first sensor system or the second sensor system is configured to continuously detect the first audio signal by using the first acoustic sensor so as to classify the first audio signal in the first processor within a first maximum time period, said first maximum time period being shorter than five seconds, and wherein the first transmitter is configured to transmit the first classification result to the central evaluator within a second maximum time period, said second maximum time period being shorter than five seconds.

10. The device as claimed in claim 1, wherein the first transmitter, the second transmitter and the central evaluator are configured to wirelessly communicate with each other in accordance with a mobile radio protocol.

11. The device as claimed in claim 1, wherein the first sensor system is configured to achieve the first classification result at a first point in time and at a second point in time by means of the first processor and to transmit it to the central evaluator by means of the first transmitter; and
- wherein the central evaluator is configured to order and indicate the first classification result of the first point in time and the first classification result of the second point in time as a function of the first point in time or of the second point in time.

12. The device as claimed in claim 1, wherein the first classification result or the second classification result is a classification result for a construction site event, the construction site event being formed as a group comprising a tool noise, a hammering noise, a sawing noise, a drilling noise, a pneumatic hammering noise, a measuring device noise, a machine noise, a burden chain noise, a concrete mixing noise, a concrete casting noise, an excavator noise, a roller noise, a material unloading noise, a tear-down noise or a scaffolding noise.

13. The device as claimed in claim 1, wherein the first acoustic sensor is configured to detect the first audio signal;
- wherein the first acoustic sensor is configured to measure a first level of the first audio signal; and
- wherein the first acoustic sensor is configured to switch the first processor or the first transmitter from a sleep mode to an operating mode only when a lower limit value for the first level is exceeded, and
- wherein the first processor is configured to determine the first classification result or the second classification result only in the operating mode, or
- wherein the first transmitter is configured to perform transmission only in the operating mode, and
- wherein the first transmitter or the first processor are configured to consume less power in the sleep mode than in the operating mode.

14. The device as claimed in claim 1, wherein the first acoustic sensor is configured to detect the first audio signal;
- wherein the first acoustic sensor is configured to measure a first level of the first audio signal; and
- wherein the first acoustic sensor is configured to set the first processor or the first transmitter so that the first classification result will be determined by the first processor and be transmitted to the central evaluator by means of the first transmitter if the first level is higher than a lower limit value, and so that no first classification result will be determined by the first processor and be transmitted to the central evaluator by means of the first transmitter if the first level is lower than or equal to the lower limit value.

15. The device as claimed in claim 1, wherein the first sensor system or the second sensor system is battery- or accumulator-operated.

16. The device as claimed in claim 1, wherein the first transmitter is configured to transmit to the central evaluator an identification of the first sensor system together with the first classification result;
- wherein the second transmitter is configured to transmit to the central evaluator an identification of the second sensor system together with the second classification result;
- wherein the memory of the central evaluator comprises an association of the identification of the first sensor system with the first location and an association of the identification of the second sensor system with the second location;
- wherein the central evaluator is configured to determine the first location on the basis of the identification of the first sensor system from the memory and to determine the second location on the basis of the identification of the second sensor system from the memory; and
- wherein the central evaluator is configured to spatially locate, in the monitoring region, a first source region of the first audio signal and a second source region of the second audio signal on the basis of the first location, the second location, the first classification result or the second classification result.

17. The device as claimed in claim 1, wherein the first transmitter is configured to transmit only the first classification result or a processed first audio signal to the central evaluator; and
- wherein the second transmitter is configured to transmit only the second classification result or a processed second audio signal to the central evaluator.

18. The device as claimed in claim 1,
- wherein the first predetermined classification result and the second predetermined classification result is a classification result for a vehicle;
- wherein the monitoring area is a road, a road network or a rail network;
- wherein the first sensor system or the second sensor system may be mounted to roads or rails,
- wherein the central evaluator is configured to provide capacity utilization of the monitoring area per location or per group of locations.

19. The device as claimed in claim 1, wherein the monitoring area is a construction site, a factory building with machines, a machine, or an inhabited place or part of an inhabited place.

20. A method of acoustic monitoring of a monitoring area, comprising:
- mounting a first sensor system comprising a first acoustic sensor, a first processor and first transmitter at a first location of the monitoring area;
- mounting a second sensor system comprising a second acoustic sensor, a second processor and second transmitter at a second location of the monitoring area, which is different from the first location,
- classifying a first audio signal detected by the first acoustic sensor by using the first processor to achieve a first classification result;
- classifying a second audio signal detected by the second acoustic sensor by using the second processor to achieve a second classification result;
- transmitting, by the first transmitter, the first classification result to a central evaluator;
- transmitting, by the second transmitter, the second classification result to the central evaluator;
- receiving, by the central evaluator, the first classification result and the second classification result; and
- generating, by the central evaluator, a monitoring output for the monitoring area as a function of the first classification result and the second classification result,
- transmitting, by the first transmitter, the first classification result comprising first local or temporal information to the central evaluator;
- generating, by the central evaluator, the first classification result in conjunction with the first local and/or temporal information as the monitoring output for the monitoring area;
- storing a predetermined process schedule plan comprising a series of activities in the monitoring area on a memory;
- arranging, by a processor, the first classification result and the second classification result in an order defined by spatial or temporal information about the first sensor system or the second sensor system, wherein the first classification result and the second classification result indicate activities in the monitoring area;

comparing, by the processor, the predetermined process schedule plan with the arranged first and second classification results; and generating, by the processor, the monitoring output as a function of a result of the comparison.

21. A non-transitory digital storage medium having a computer program stored thereon, and run by a computer, to perform the method of acoustic monitoring of a monitoring area, said method comprising:

mounting a first sensor system comprising a first acoustic sensor, a first processor and first transmitter at a first location of the monitoring area;

mounting a second sensor system comprising a second acoustic sensor, a second processor and second transmitter at a second location of the monitoring area, which is different from the first location, classifying a first audio signal detected by the first acoustic sensor by using the first processor to achieve a first classification result;

classifying a second audio signal detected by the second acoustic sensor by using the second processor to achieve a second classification result;

transmitting, by the first transmitter, the first classification result to a central evaluator;

transmitting, by the second transmitter, the second classification result to the central evaluator;

receiving, by the central evaluator, the first classification result and the second classification result; and generating, by the central evaluator, a monitoring output for the monitoring area as a function of the first classification result and the second classification result, transmitting, by the first transmitter, the first classification result comprising first local or temporal information to the central evaluator;

generating, by the central evaluator, the first classification result in conjunction with the first local and/or temporal information as the monitoring output for the monitoring area;

storing a predetermined process schedule plan comprising a series of activities in the monitoring area on a memory;

arranging, by a processor, the first classification result and the second classification result in an order defined by spatial or temporal information about the first sensor system or the second sensor system, wherein the first classification result and the second classification result indicate activities in the monitoring area;

comparing, by the processor, the predetermined process schedule plan with the arranged first and second classification results; and generating, by the processor, the monitoring output as a function of a result of the comparison.

22. The device as claimed in claim 1, wherein the first transmitter is configured to transmit a first signal to the central evaluator only if the first classification result matches a first predetermined classification result;

wherein the second transmitter is configured to transmit a second signal to the central evaluator only if the second classification result matches a second predetermined classification result; and wherein the central evaluator is configured to count, on the basis of the first signal, how many times, per time interval, the first sensor system has determined the first predetermined classification result, or to count, on the basis of the second signal, how many times, per time interval, the second sensor system has determined the second predetermined classification result.

* * * * *